(12) United States Patent
Paull

(10) Patent No.: US 10,161,112 B2
(45) Date of Patent: Dec. 25, 2018

(54) VALVE SYSTEMS AND METHOD FOR ENHANCED GRADING CONTROL

(71) Applicant: Philip Paull, Noblesville, IN (US)

(72) Inventor: Philip Paull, Noblesville, IN (US)

( * ) Notice: Subject to any disclaimer, the term of this patent is extended or adjusted under 35 U.S.C. 154(b) by 113 days.

(21) Appl. No.: 15/485,319

(22) Filed: Apr. 12, 2017

(65) Prior Publication Data
US 2017/0314234 A1 Nov. 2, 2017

Related U.S. Application Data

(63) Continuation-in-part of application No. 14/720,433, filed on May 22, 2015, now Pat. No. 9,670,641.
(Continued)

(51) Int. Cl.
*E02F 9/22* (2006.01)
*E02F 9/26* (2006.01)
(Continued)

(52) U.S. Cl.
CPC .............. *E02F 9/265* (2013.01); *E02F 3/301* (2013.01); *E02F 3/32* (2013.01); *E02F 3/3414* (2013.01); *E02F 3/3417* (2013.01); *E02F 3/401* (2013.01); *E02F 3/422* (2013.01); *E02F 3/425* (2013.01); *E02F 3/431* (2013.01); *E02F 3/433* (2013.01); *E02F 3/434* (2013.01); *E02F 3/435* (2013.01);
(Continued)

(58) Field of Classification Search
CPC ........ E02F 9/0875; E02F 9/2267; F16K 31/02
USPC .......................................................... 37/902
See application file for complete search history.

(56) References Cited

U.S. PATENT DOCUMENTS 2,042,196 A  5/1936  Senz
2,899,760 A  8/1959  Armington et al.
(Continued)

FOREIGN PATENT DOCUMENTS

KR     701031     3/2007

OTHER PUBLICATIONS

Chang, et al., "Excavating Force Analysis and Calculation of Dipper Handle", Consumer Electronics Communications and Networks (CECNet), 2011 International Conference on; DOI: 10.1109/CECNET. 2011.5768595; Publication Year: 2011, pp. 4068-4071
(Continued)

*Primary Examiner* — Gary S Hartmann
(74) *Attorney, Agent, or Firm* — C. John Brannon; Brannon Sowers & Cracraft PC

(57) ABSTRACT

A valve system, including first, second, third and fourth ports, a first flow path connecting the first and second ports, a second flow path connecting the third and fourth ports, with valves connected in the first and second flow paths, and energizable to block the same. A third flow path connects the first and second ports and a fourth flow path connects the third and fourth ports. The third and fourth flow paths are more restricted than the respective first and second flow paths. A fifth flow path connects the first and fourth ports and a sixth flow path connects the second and third ports. When the third and fourth flow paths are open, the first, second, fifth, and sixth flow paths are blocked. When the first and second flow paths are open, the third, fourth, fifth, and sixth flow paths are blocked. When the fifth and sixth flow paths are open, the first, second, third, and fourth, flow paths are blocked.

13 Claims, 34 Drawing Sheets

Related U.S. Application Data

(60) Provisional application No. 62/325,208, filed on Apr. 20, 2016.

(51) Int. Cl.

| | | |
|---|---|---|
| *E02F 3/42* | (2006.01) | |
| *E02F 3/32* | (2006.01) | |
| *E02F 3/34* | (2006.01) | |
| *E02F 3/43* | (2006.01) | |
| *E02F 9/20* | (2006.01) | |
| *F15B 11/16* | (2006.01) | |
| *F15B 13/06* | (2006.01) | |
| *E02F 3/30* | (2006.01) | |
| *E02F 3/40* | (2006.01) | |
| *E02F 9/08* | (2006.01) | |
| *E02F 9/24* | (2006.01) | |
| *F16K 31/06* | (2006.01) | |
| *F16K 1/12* | (2006.01) | |

(52) U.S. Cl.
CPC ............. *E02F 3/436* (2013.01); *E02F 3/437* (2013.01); *E02F 9/0875* (2013.01); *E02F 9/2041* (2013.01); *E02F 9/2228* (2013.01); *E02F 9/2267* (2013.01); *E02F 9/245* (2013.01); *E02F 9/262* (2013.01); *F15B 11/16* (2013.01); *F15B 13/06* (2013.01); *F16K 1/12* (2013.01); *F16K 31/0675* (2013.01)

(56) References Cited

U.S. PATENT DOCUMENTS

| | | | |
|---|---|---|---|
| 2,993,285 A | 7/1961 | Hoxie | |
| 3,065,557 A | 11/1962 | Pewthers | |
| 3,113,390 A | 12/1963 | Pewthers | |
| 3,238,648 A | 3/1966 | Cobb et al. | |
| 3,695,474 A | 10/1972 | Blakely | |
| 4,024,710 A | 5/1977 | Zelle | |
| 4,410,049 A | 10/1983 | Molin | |
| 4,512,090 A | 4/1985 | Billings | |
| 4,625,438 A | 12/1986 | Mozer | |
| 4,945,723 A * | 8/1990 | Izumi | E02F 9/2225 137/596.14 |
| 4,967,850 A | 11/1990 | Bargfrede et al. | |
| 5,048,296 A | 9/1991 | Sunamura et al. | |
| 5,065,326 A | 11/1991 | Sahm | |
| 5,253,449 A | 10/1993 | Webb et al. | |
| 5,488,787 A * | 2/1996 | Aoyagi | E02F 9/2217 172/2 |
| 5,835,874 A | 11/1998 | Tooichi | |
| 6,032,093 A | 2/2000 | Denbraber et al. | |
| 6,282,477 B1 | 8/2001 | Gudat et al. | |
| 6,434,863 B1 | 8/2002 | Meurer | |
| 6,460,276 B1 | 10/2002 | Ireland et al. | |
| 6,941,687 B2 | 9/2005 | Sharkness | |
| 7,874,152 B2 | 1/2011 | Pfaff | |
| 7,891,121 B2 | 2/2011 | Smoljo | |
| 8,437,921 B2 | 5/2013 | Paull | |
| 8,875,420 B2 * | 11/2014 | Paull | E02F 5/145 172/233 |
| 8,875,421 B2 * | 11/2014 | Paull | E02F 9/265 172/233 |
| 9,032,724 B2 | 5/2015 | Pfaff | |
| 9,611,620 B2 * | 4/2017 | Paull | E02F 3/401 |
| 9,670,641 B2 * | 6/2017 | Paull | E02F 9/2228 |
| 2002/0038548 A1 | 4/2002 | Sharkness et al. | |
| 2002/0048548 A1 | 4/2002 | Chaklader | |
| 2003/0056353 A1 | 3/2003 | Sharkness et al. | |
| 2003/0209134 A1 | 11/2003 | Tabor | |
| 2003/0230010 A1 | 12/2003 | Sharkness | |
| 2009/0178816 A1 | 7/2009 | Piekutowski | |
| 2009/0272109 A1 | 11/2009 | Pfaff | |
| 2009/0320461 A1 | 12/2009 | Morinaga | |
| 2010/0312428 A1 | 12/2010 | Roberge | |
| 2011/0056194 A1 | 3/2011 | Wojcicki | |
| 2011/0308242 A1 | 12/2011 | Pfaff | |
| 2013/0054097 A1 | 2/2013 | Montgomery | |
| 2013/0073151 A1 | 3/2013 | Wada | |
| 2014/0032058 A1 | 1/2014 | Stratton | |
| 2014/0222301 A1 | 8/2014 | Paull | |
| 2014/0360174 A1 | 12/2014 | Sohn | |

OTHER PUBLICATIONS

Hatch, et al., "A Ferrofludic Magnetic Micropump", Journal of Microelectromechanical Systems; 2001; vol. 10, Issue 2, pp. 215-221; DOI: 10.1109/84.925748.

Kang, et al., "Path Tracking For a Hydraulic Excavator Utilizing Proportional-Derivative and Linear Quadratic Control", Control Applications (CCA), 2014 IEEE Conference on; DOI: 10.1109/CCA.2014.6981440; Publication Year: 2014, pp. 808-813.

Soon-Kwang, et al., "Development and Evaluation of Simulator for Field Robot", Smart Manufacturing Application, 2008. ICSMA 2008. International Conference on; DOI: 10.1109/ICSMA.2008.4505565; Publication Year: 2008, pp. 419-423.

Vahed, et al., "On-Line Energy-Based Method for Soil Estimation and Classification in Autonomous Excavation", Intelligent Robots and Systems, 2007. IROS 2007. IEEE/RSJ International Conference on DOI: 10.1109/IROS.2007.4399196; Publication Year: 2007, pp. 554-559.

\* cited by examiner

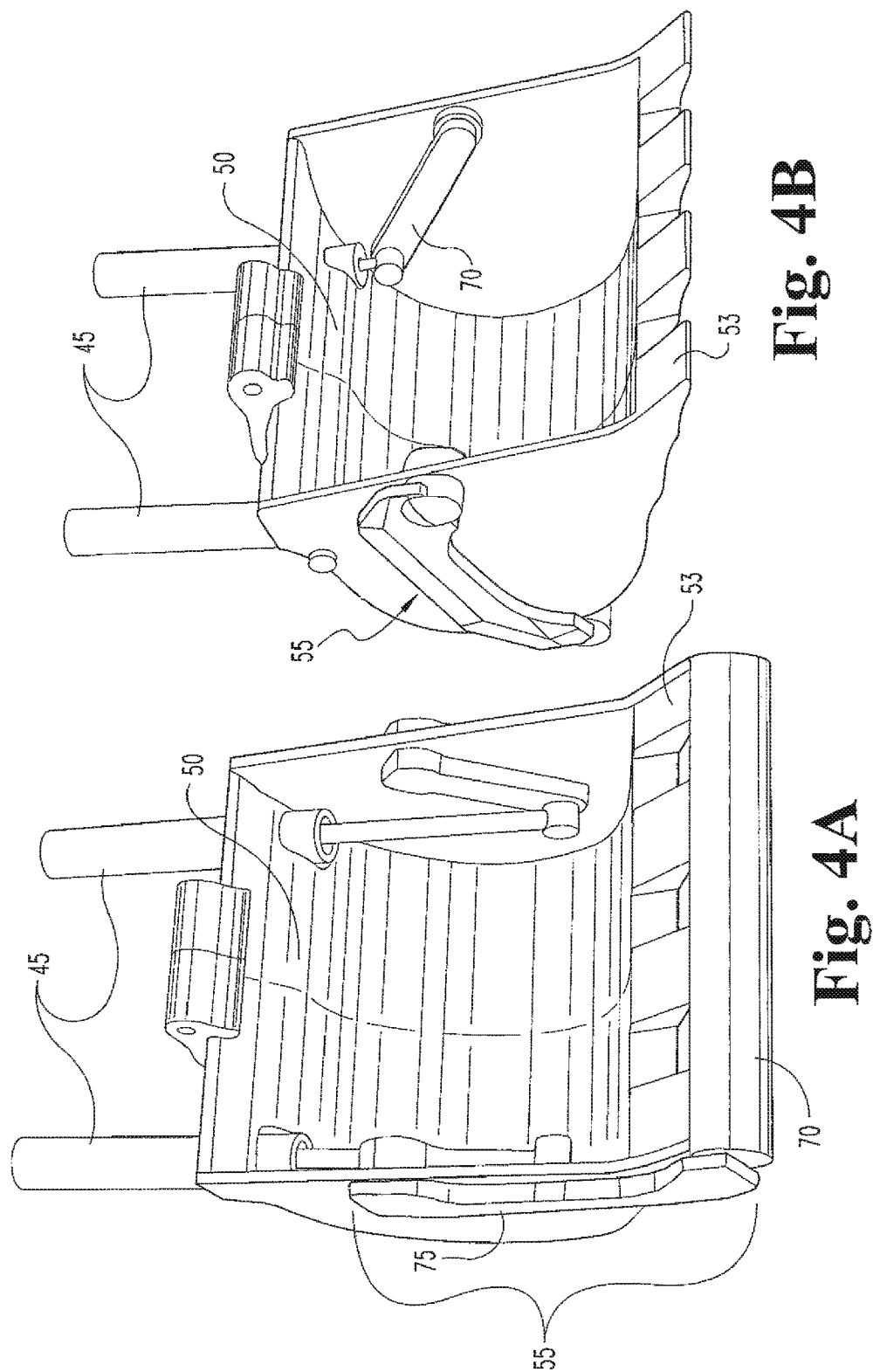

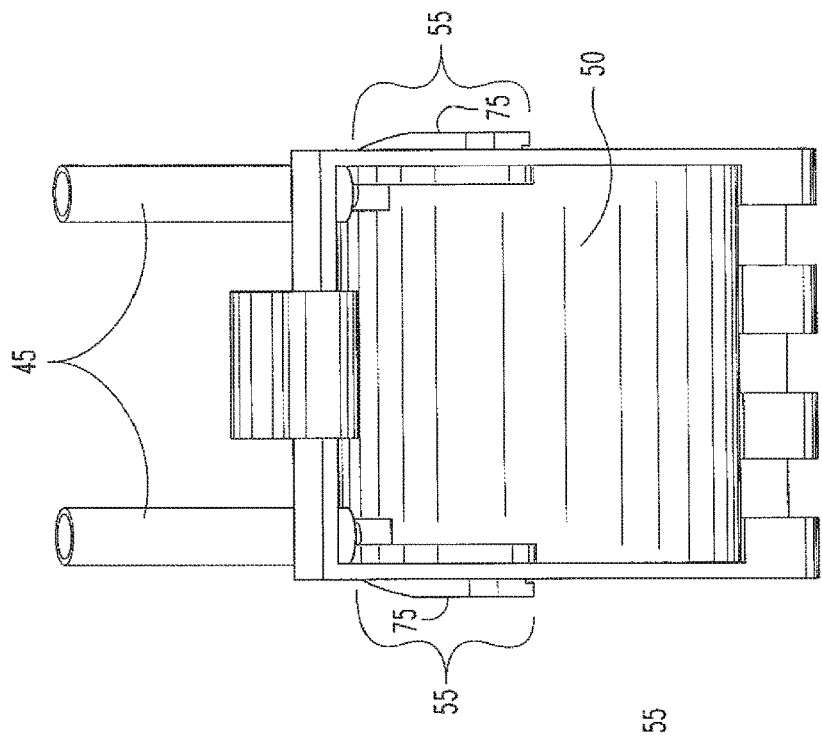
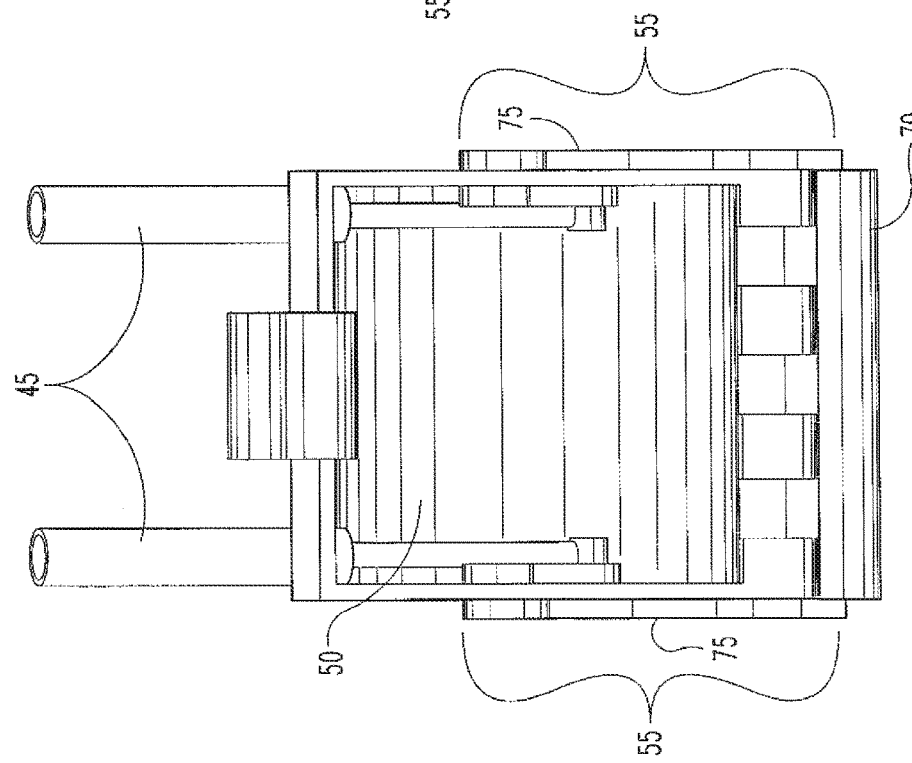
Fig. 6A
Fig. 6B

From Hydraulic Piloted Joystick

VALVE SYSTEMS AND METHOD FOR ENHANCED GRADING CONTROL

CROSS-REFERENCE TO RELATED APPLICATIONS

This patent application is a continuation in part of and claims priority to co-pending U.S. patent application Ser. No. 14/720,433, filed on May 22, 2015; and further claims priority to U.S. Provisional Patent Application Ser. No. 62/325,208, filed on Apr. 20, 2016, both of which are incorporated herein by reference.

TECHNICAL FIELD

The present novel technology relates generally to the field of mechanical engineering, and, more particularly, to a method and apparatus for enhancing control of a digging machine, such as to prevent digging beyond a predetermined depth, grade, or contour, and/or to maintain a flat orientation of a bucket while digging.

BACKGROUND

Keeping on grade while digging with a back hoe continues to be a challenge even for the most experienced operators. More so than most digging machines, the extended lever arm of the hoe combined with the downward digging forces applied produce unwanted wiggling and vibration of the hoe arm and bucket. Even experienced operators, having developed a tactile 'feel' for how well the bucket is digging and cutting, have difficulty maintaining grade, and the more precisely the grade must be maintained, the more difficult and draining the job. While very good operators are able to maintain grade reasonably well even over prolonged digging sessions, the effort does take its toll both physically and mentally.

Conventional laser alignment and even GPS-guided devices have been developed to give the operator more reliable feedback regarding how close the digging bucket is to the desired grade. Such devices provide feedback to the operator that the bucket is too high, too low, or on grade at any given time during the digging operation. However, the operator must still receive and manually respond to the feedback signals (i.e., up or down) provided by the devices. Such constant correction of the bucket depth has proven to be physically demanding and exhausting.

Thus, there is a need for a system for automatically preventing overdigging and for automatically keeping the excavation on a predetermined grade. The present novel technology addresses this need.

SUMMARY

The present novel technology relates to a method and apparatus for maintaining a predetermined grade while digging with a back hoe. One object of the present novel technology is to provide an improved means for guiding a track hoe bucket with a generally horizontally flat orientation while digging a generally horizontal path through soil. Related objects and advantages of the present novel technology will be apparent from the following description.

BRIEF DESCRIPTION OF THE DRAWINGS

FIG. 4A is a perspective view of the bucket of FIG. 2 having the contact member engaged.

FIG. 4B is a perspective view of the bucket of FIG. 2 having the contact member disengaged.

FIG. 6A is a front elevation view of the bucket of FIG. 2 having the contact member engaged.

FIG. 6B is a front elevation view of the bucket of FIG. 2 having the contact member disengaged.

DETAILED DESCRIPTION

Figure 1:
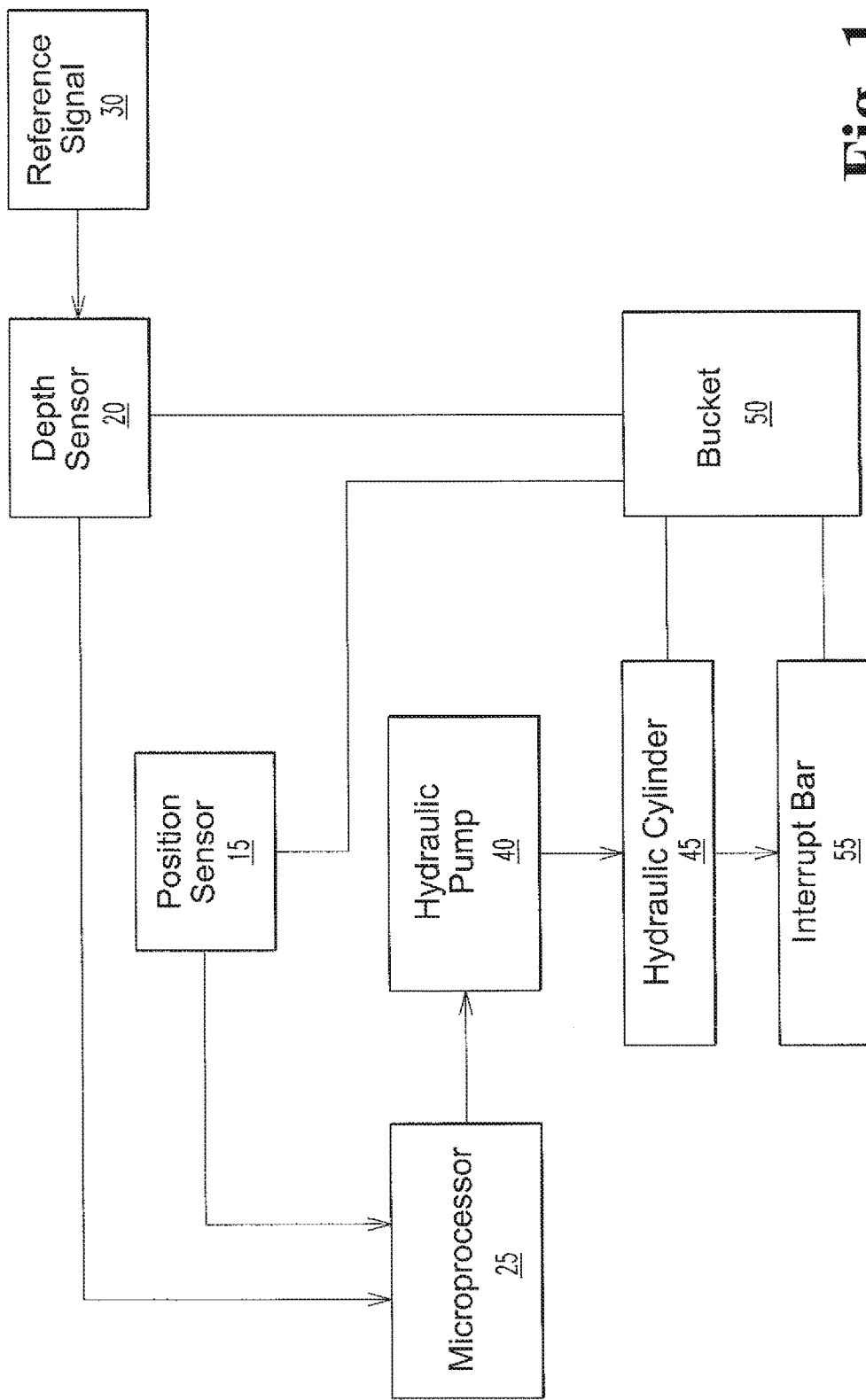
FIG. 1 is a schematic diagram of a first embodiment of the present novel technology, a system for automatically maintaining a back hoe bucket on grade during a digging operation.

For the purposes of promoting an understanding of the principles of the novel technology and presenting its currently understood best mode of operation, reference will now be made to the embodiments illustrated in the drawings and specific language will be used to describe the same. It will nevertheless be understood that no limitation of the scope of the novel technology is thereby intended, with such alterations and further modifications in the illustrated device and such further applications of the principles of the novel technology as illustrated therein being contemplated as would normally occur to one skilled in the art to which the novel technology relates.

A first embodiment of the present novel technology is illustrated in FIGS. 1 and 3-9C, a system 10 for automatically preventing a track hoe bucket, back hoe bucket, loader bucket, skid loader bucket or like bucket or shovel from digging substantially deeper than a predetermined grade depth parameter. While the following example and drawings focus on a hoe bucket, the claimed novel technology is not limited to a hoe system and includes other bucketed digging machines, such as front loaders and the like. The system 10 includes a position sensor 15 and a depth sensor 20 operationally connected to a microprocessor 25 and likewise connected in communication with a reference signal 30. The sensors 15, 20 may be separate or they may both be into the same device or devices (such as a GPS transceiver). Further, some embodiments may only have a depth sensor 20, while others may only have a position sensor 15. The reference signal 30 may be from a GPS satellite, a laser, and/or the like.

The microprocessor 25 is also connected to an actuator assembly 37. The actuator assembly typically 37 includes a pressure source or pump 40, such as a hydraulic or pneumatic pump 40 connected in fluidic communication with at least one hydraulic or pneumatic cylinder 45. The fluidic cylinder 45 is fixedly, and typically pivotably, connected to a hoe or shovel bucket 50 having a cutting edge or teeth 53. While actuator assembly 37 is described herein as being of the pressurized piston/cylinder type, actuator assembly 37 may likewise include other types of actuators, such as mechanical, electromechanical, and/or the like.

Bucket 50 is likewise connected to the distal portion of a hoe armature 51. The hydraulic cylinder 45 may also be operationally connected to an interrupt bar 55, which is likewise pivotably connected to the bucket 50. The position and depth sensors 15, 20 are likewise operationally connected to the bucket 50 such that the depth of the bucket, and the cutting edge 53, is either directly measured (such as by direct attachment of the sensor(s) 15, 20 to the bucket 50), or calculated (such as by connection of the sensor(s) 15, 20 to a predetermined position on the distal portion of the armature 51 connected to the bucket 50).

Figure 7:
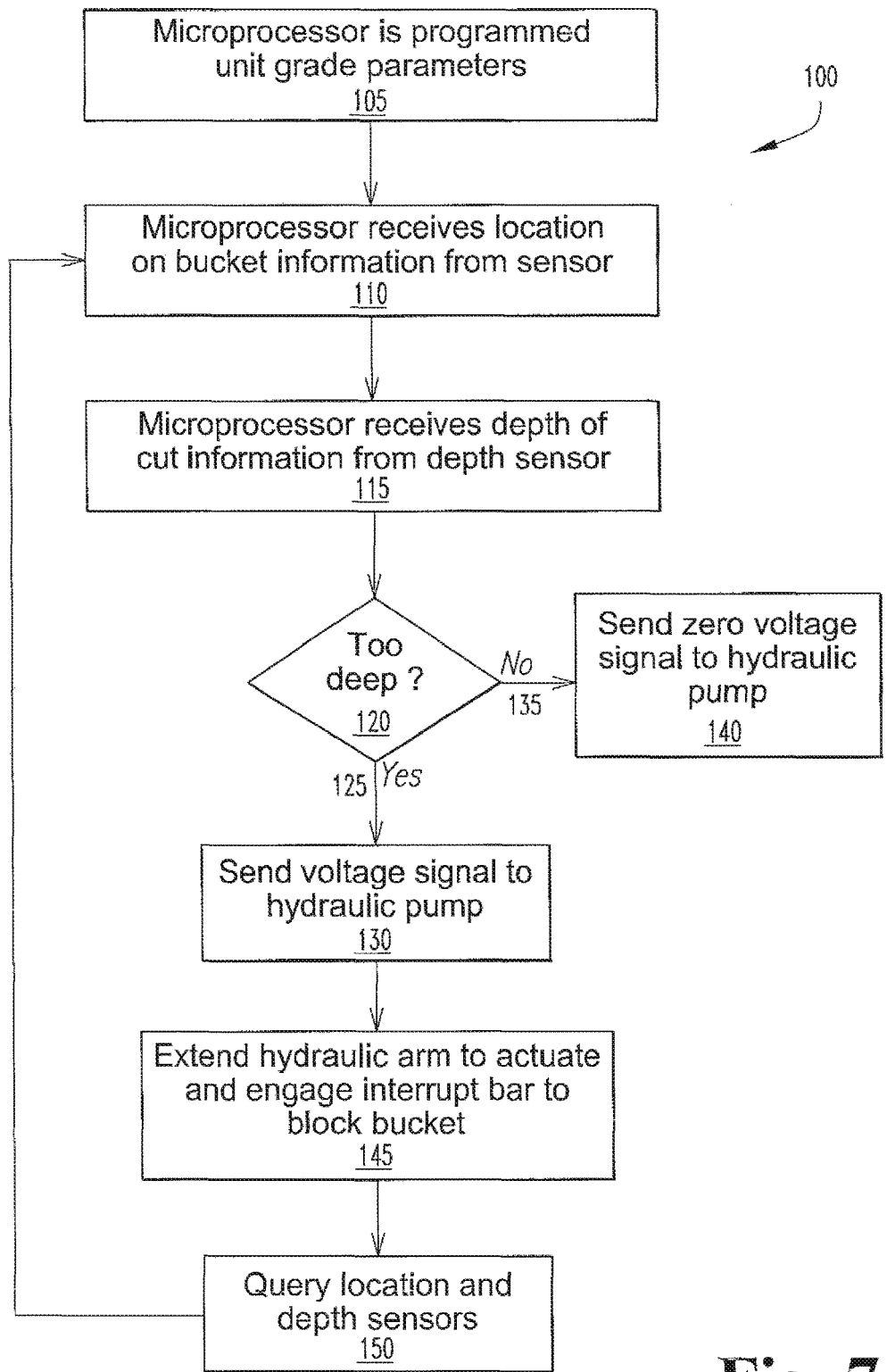
FIG. 7 is a schematic diagram of the process of FIG. 1.
Figure 8:
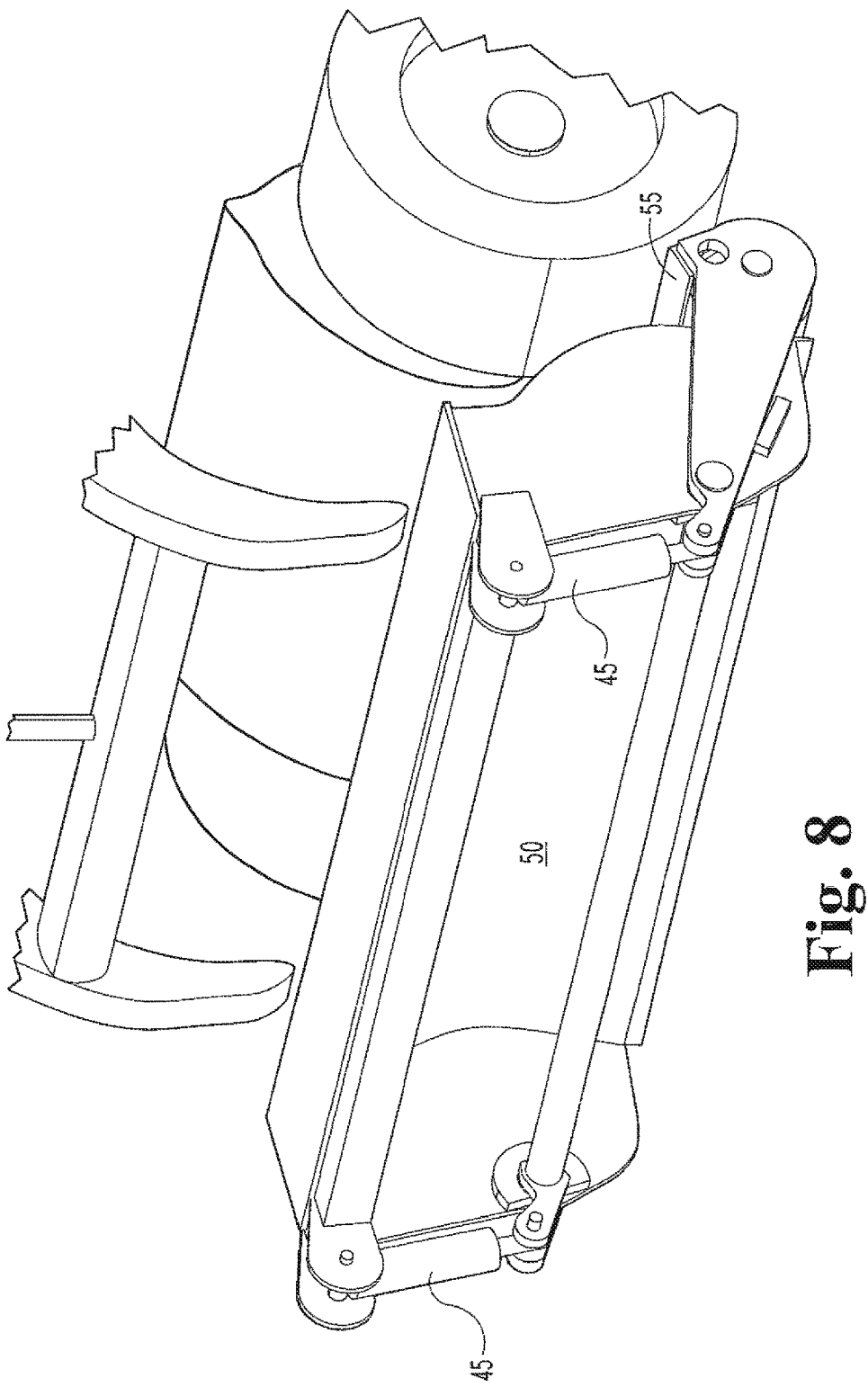
FIG. 8 a perspective view of a first embodiment system including an elongated bucket and interrupt bar assembly as connected to a skid loader.
Figure 9:
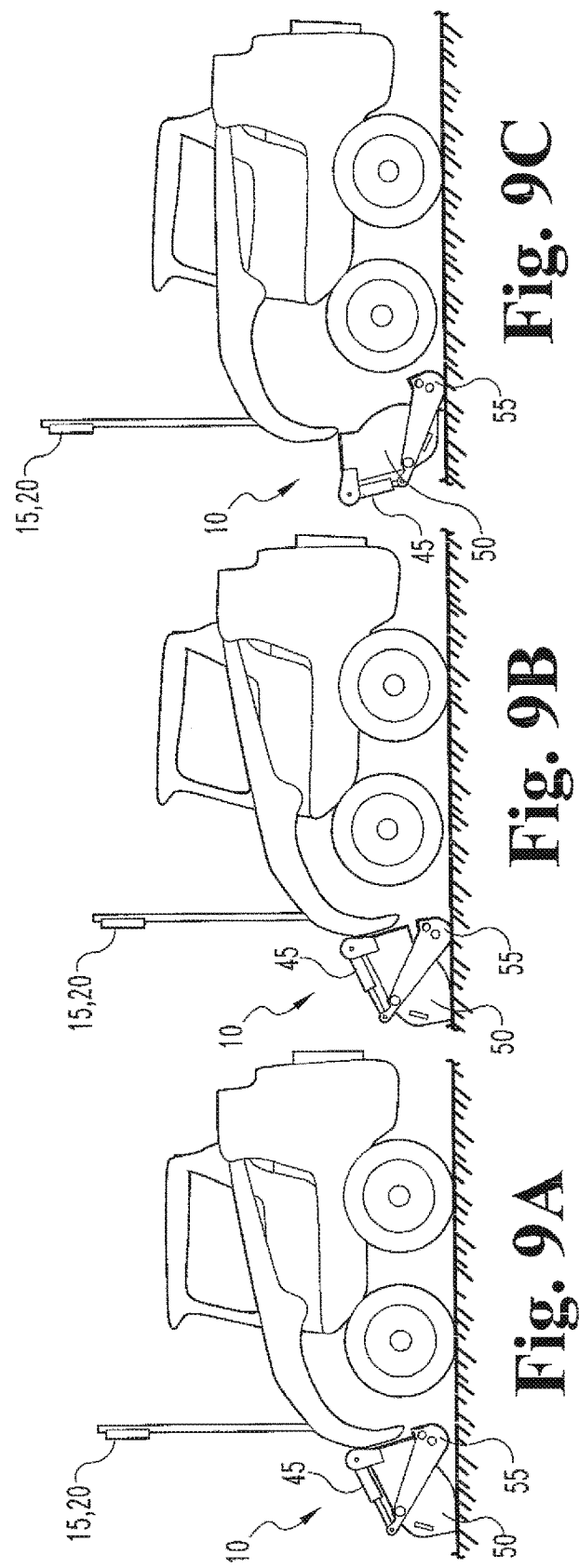
FIG. 9A is a schematic view of the loader of FIG. 8 with the interrupt bar positioned away from the cutting edge of the bucket.
FIG. 9B is a schematic view of the loader of FIG. 8 with the interrupt bar moved toward a deployed position adjacent the cutting edge of the bucket.
FIG. 9C is a schematic view of the loader of FIG. 8 with the interrupt bar in a deployed position adjacent the cutting edge of the bucket.
Figure 10:
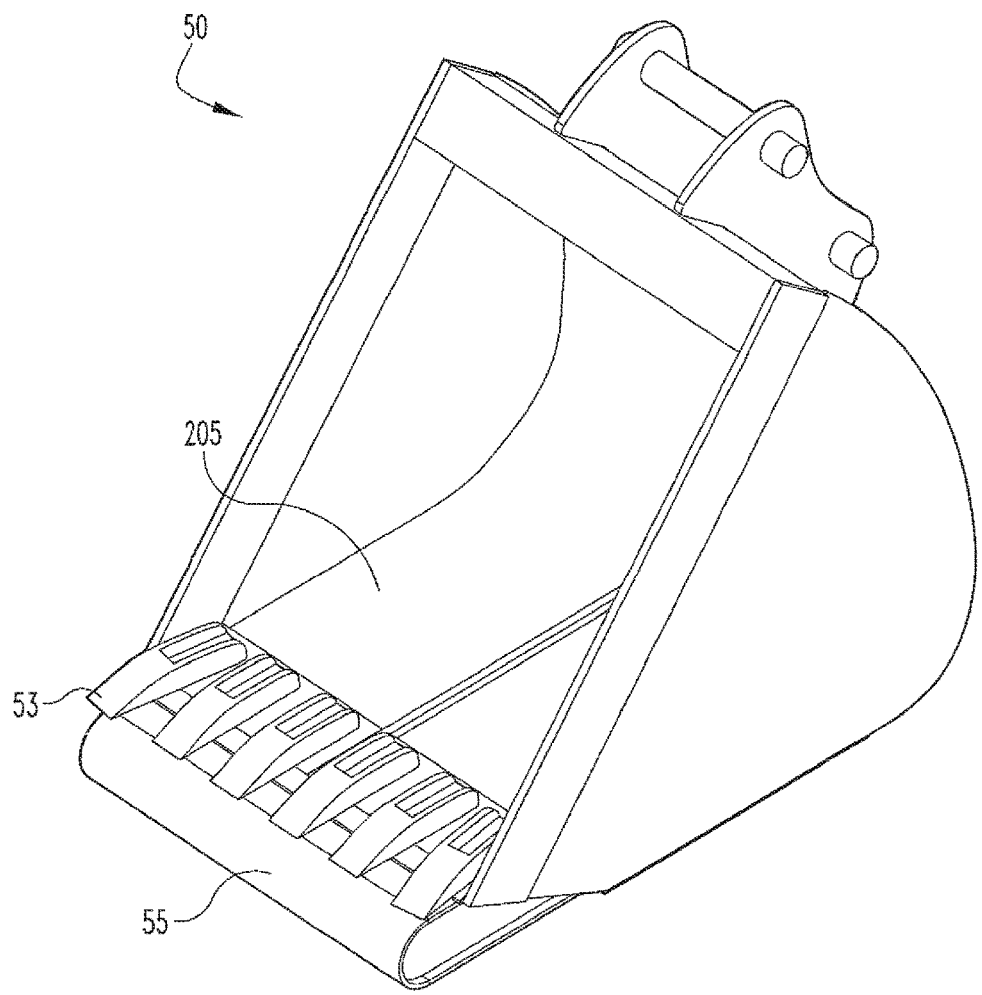
FIG. 10 is a front perspective view of another embodiment back hoe bucket according to the system of FIG. 2.
Figure 11:
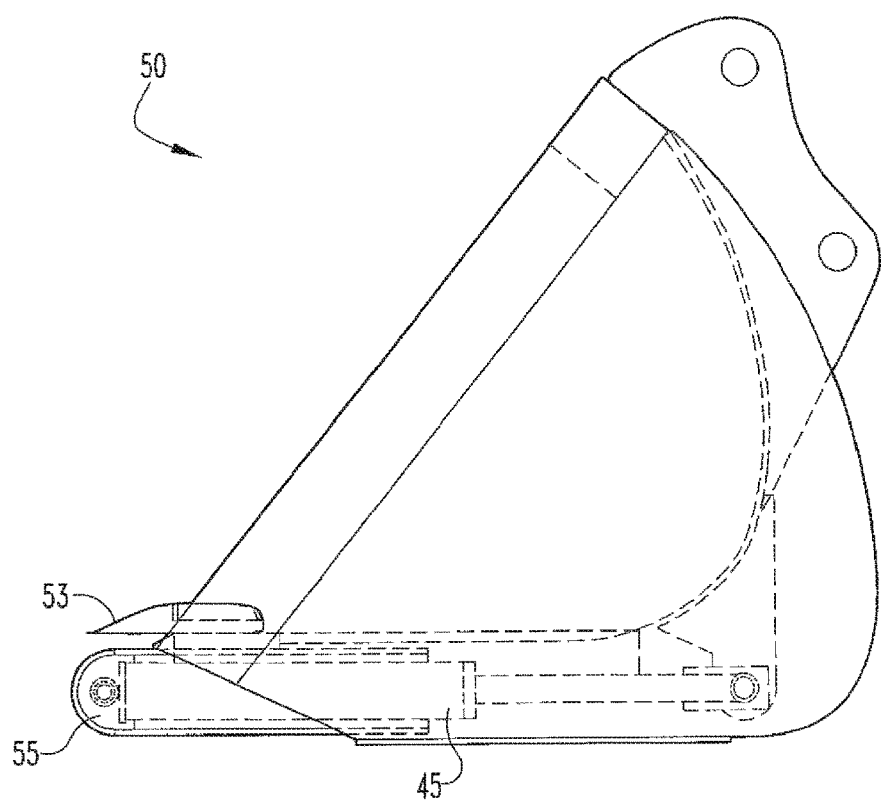
FIG. 11 is a partially cut away side elevation view of the bucket of FIG. 10.
Figure 12B:
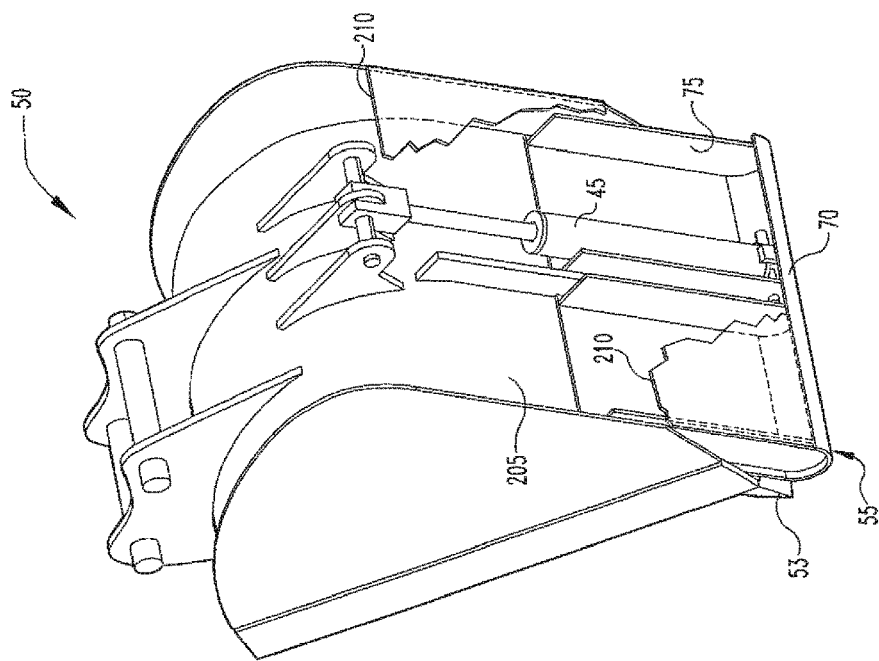
FIG. 12B is a partially cut away rear perspective view of the bucket of FIG. 10.
Figure 12A:
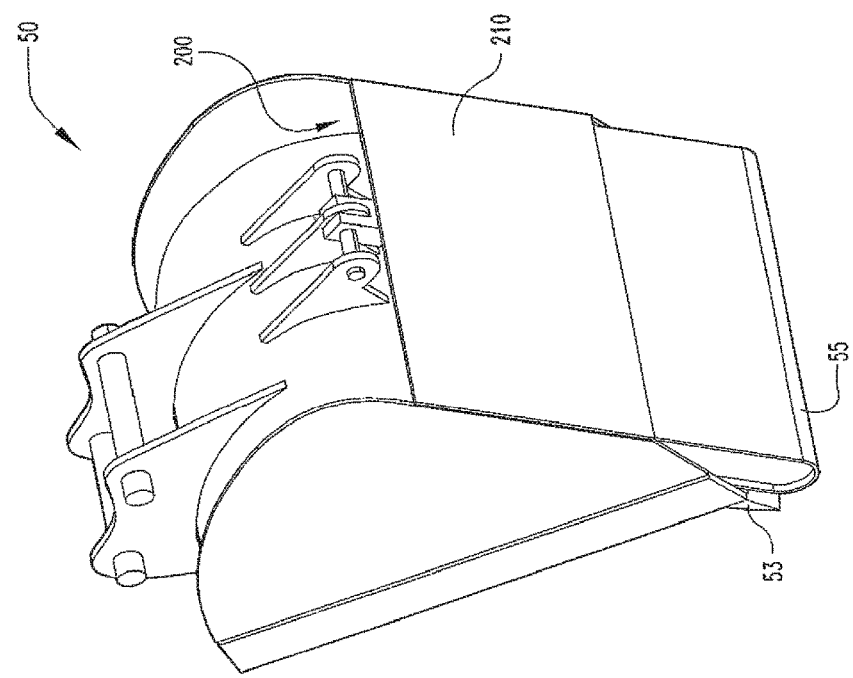
FIG. 12A is a rear perspective view of the bucket of FIG. 10.

In operation 100, as schematically illustrated in FIG. 7, microprocessor 25 is first programmed with the location and depth parameters of the grade or excavation to be dug 105. The reference signal 30 is received 110 by the depth sensor 20 and/or microprocessor 25 when the digging machine is in operation, and the depth of the bucket 50 is calculated in substantially real-time. The location of the bucket 50 is also typically calculated from information supplied by the location sensor 15 and received 115 by the microprocessor 25. In some embodiments, the position sensor 15 may also be used to calculate the orientation of the bucket 50, such as its degree of pivot relative to a predetermined base orientation, such as teeth down and parallel to the horizontal. The depth, location, and orientation information are used to calculate the position of the bucket 50 and this is compared 120 by the microprocessor 25 to the programmed grade information. If the bucket 50 begins to exceed 125 programmed grade parameters, such as moving deeper than the programmed grade, an actuation signal 130, typically a voltage, is generated by the microprocessor 25 and sent to the hydraulic pump 40, energizing the pump 40 and actuating the cylinder 45 to extend 145 and pivot the interrupt bar 55 into position to engage the ground ahead of the bucket 50. This operation is shown sequentially in FIGS. 9A-9C, wherein the interrupt bar 55 connected to a skid loader bucket 50 is moved from a standby position (FIG. 9A) into an engaged position (FIG. 9C), preventing the bucket 50 from digging into the ground and, typically, slightly lifting the front end of the loader. If the bucket position does not exceed 135 the programmed grade parameters, a null signal 140 is sent to the pump 40. Engagement of the ground by the interrupt bar 55 prevents the shovel or bucket 50 from penetrating deeper into the ground. The microprocessor 25 may then query the sensors 15, 20 for bucket location information, and the cycle starts over. It should be noted that although the process of digging to grade is typically one of vertically removing dirt, the programmed grade may likewise be a substantially horizontal parameter, such as the walls of a dug basement. The microprocessor 25 may likewise combine vertical, horizontal, and/or bucket orientation parameters to govern the excavation of curved and/or complex shape surfaces.

The interrupt bar 55 is typically an elongated member made of a structural material, such as steel. The interrupt bar 55 is more typically rounded or generally cylindrical. The interrupt bar 55 is generally U-shaped, having an elongated and generally rounded middle portion 70 and parallel connection members 75 extending from either end of the middle portion at generally right angles from the axis of the middle portion 70. The middle portion 70 and connection members 75 may define a unitary piece (see FIGS. 10-12B), and/or may be connected together as separate pieces.

Figure 2:
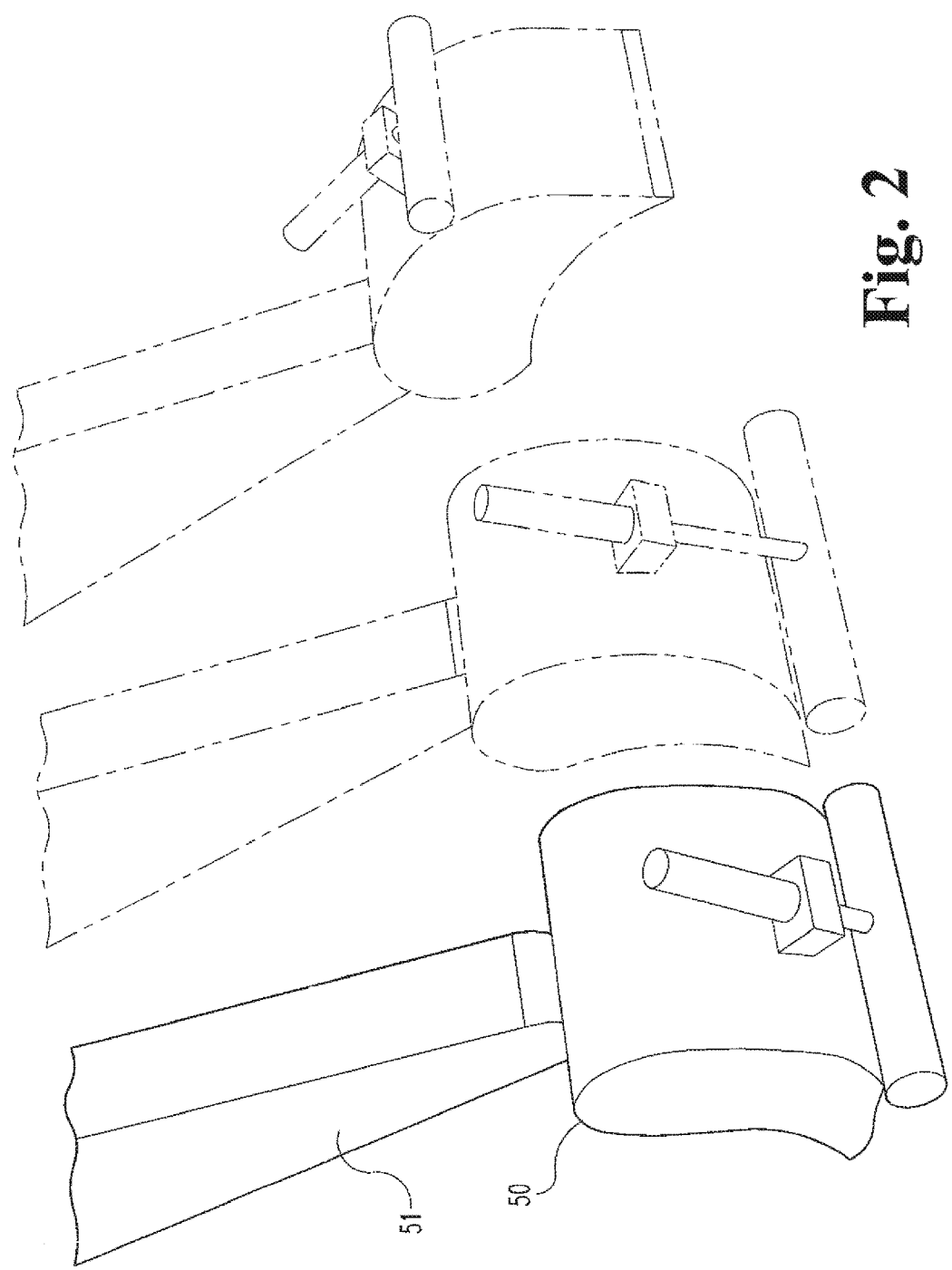
FIG. 2 is a perspective view of a second embodiment of the present novel technology, a system for automatically maintaining a back hoe bucket on grade during a digging operation.
Figure 3:
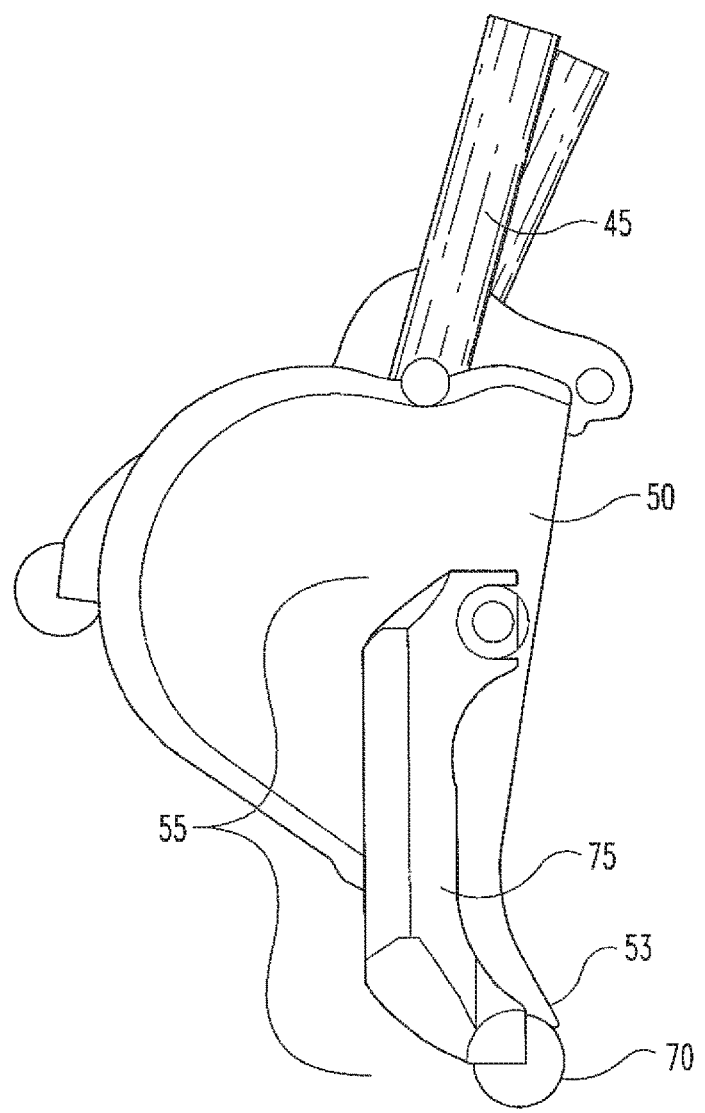
FIG. 3 is a side elevation view of a first embodiment back hoe bucket of the resent novel technology.
Figure 5B:
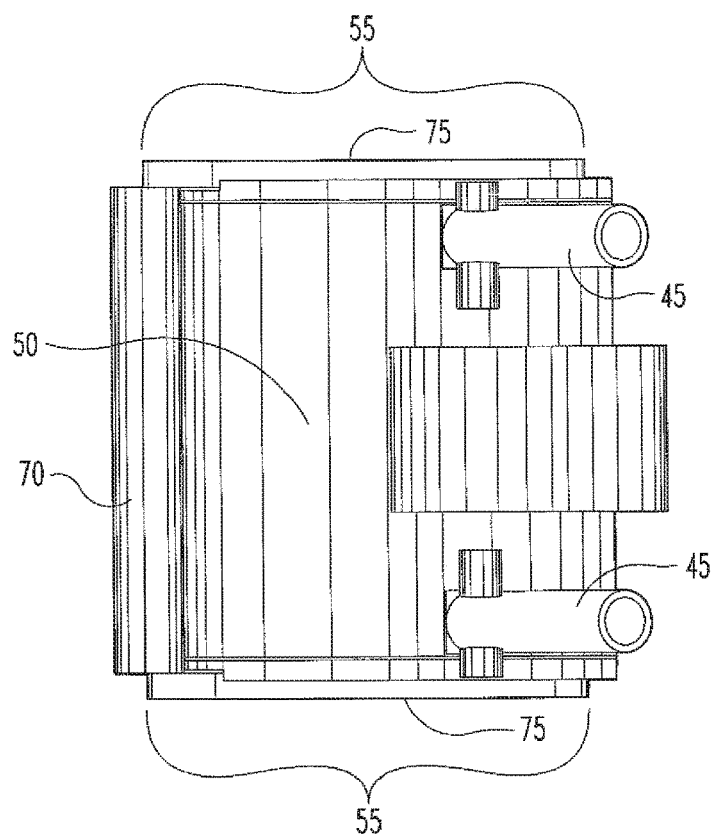
FIG. 5B is a top plan view of the bucket of FIG. 2 having the contact member disengaged.
Figure 5A:
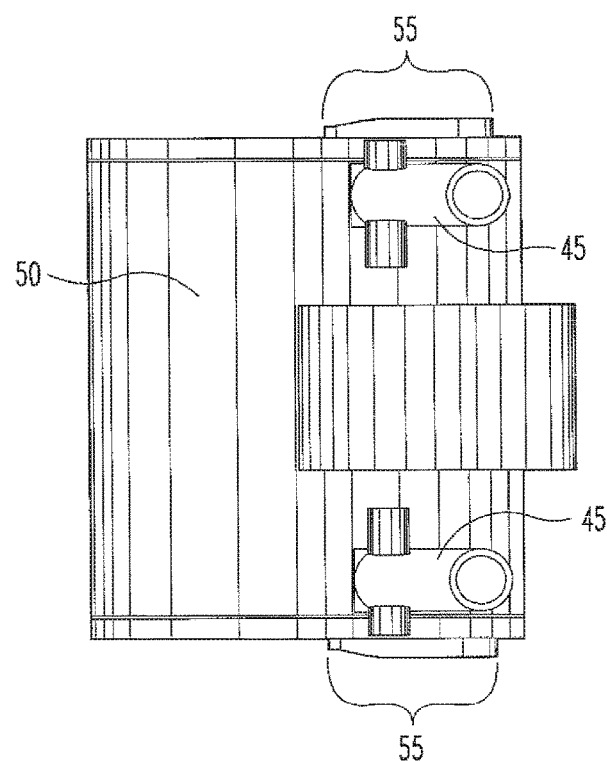
FIG. 5A is a top plan view of the bucket of FIG. 2 having the contact member engaged.

FIG. 2 illustrates one specific configuration of the system 10 wherein a single hydraulic cylinder 45 is used to pivot the interrupt bar 55, while FIGS. 3-9C illustrate a configuration wherein a pair of cylinders 45 are used. The cylinders 45 are illustrated as positioned in the interior of the bucket 50, but may likewise be positioned adjacent the exterior of the bucket 50.

FIGS. 10-12B illustrate a variation of the bucket 50 illustrated in FIG. 2 and discussed above, wherein the interrupt bar 55 and piston-cylinder actuator 45 are enclosed in a recess 200 formed in the bucket 50. In this embodiment, the recess 200 is defined by inner bucket wall 205 and outer bucket wall 201 which create the double-walled bottom portion or recess 200. The actuator 45 is positioned in the recess 200 and is fixedly mounted to the bucket 50 at one end and to the interrupt bar 55 at the other. Energization of the actuator 45 advances the interrupt bar 55 out of the recess 200 to a position adjacent the cutting edge 53, where it is interposed between the bucket 50 and the ground. Bottom wall 210 acts to protect the actuator 45 from clogging by dirt and debris, as well as from impact damage and the like.

In other embodiments, the grade predetermination function of the microprocessor may be replaced by a mechanical grade indicator, such as a string, line, and/or surface, and the microprocessor voltage or signal generation function may be replaced mechanically, such as by a contact switch or control armature or member.

Figure 13:
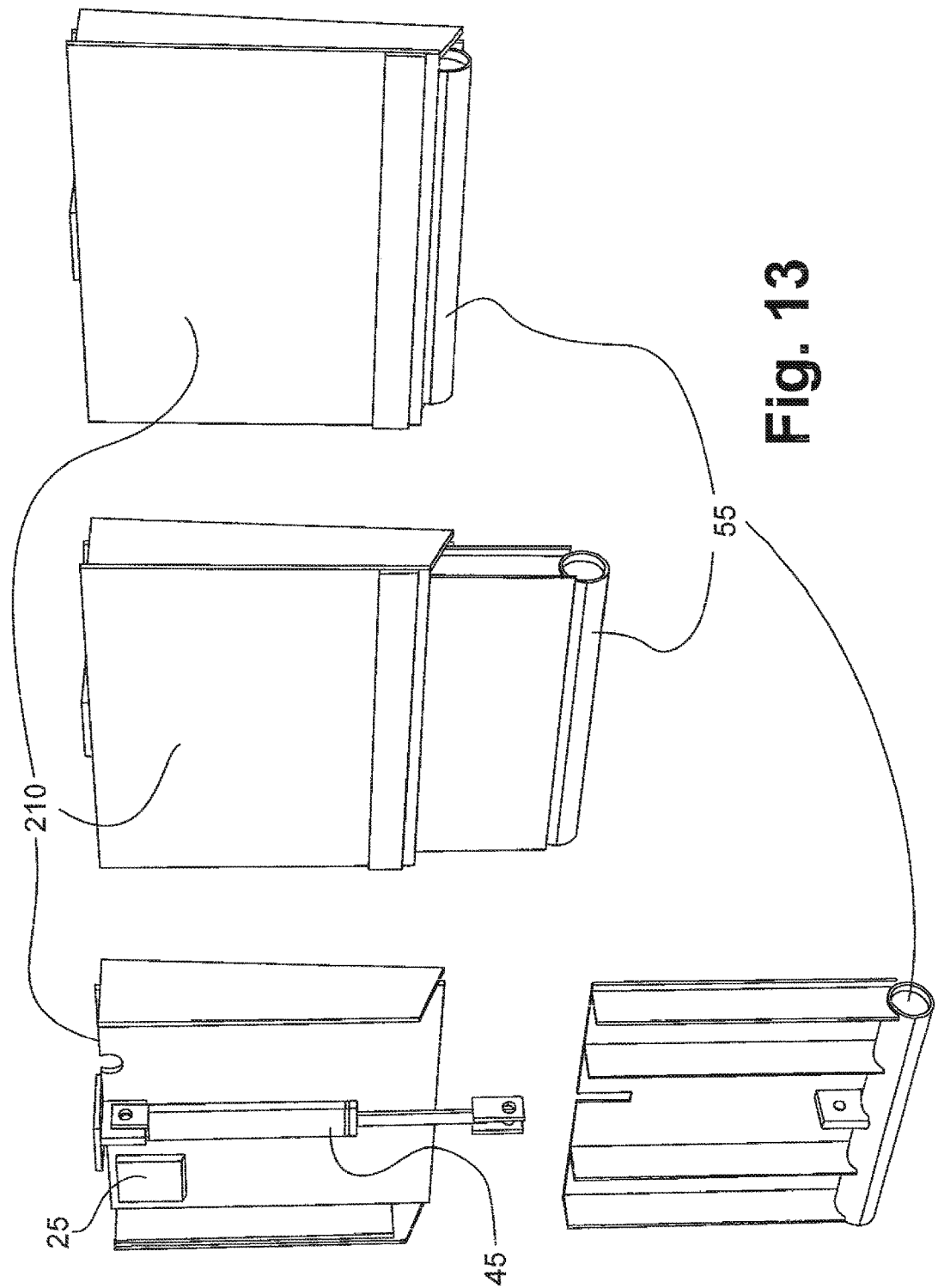
FIG. 13 is an exploded perspective view of a third embodiment of the present novel technology, a kit for converting a standard hoe bucket into a bucket according to the embodiment of claim 1 or 2.

In one embodiment, as shown in FIG. 13, a kit 250 is provided for retrofitting existing buckets. The kit 250 includes an interrupt bar 55 operationally connected to a piston actuator 45 and connectable to and/or slidingly disposed in a housing 210. The housing 210 is structurally connectable to a bucket, such as by bolting, welding, and/or the like, to define a bottom wall 210. One or more sensors 15, 20 are typically connected to, and more typically disposed within, the housing 210 and are likewise operationally connectable to a controller 25 (as shown in previous FIGs.). The piston actuator 45 is connectable to a hydraulic pressure source.

Figure 14:
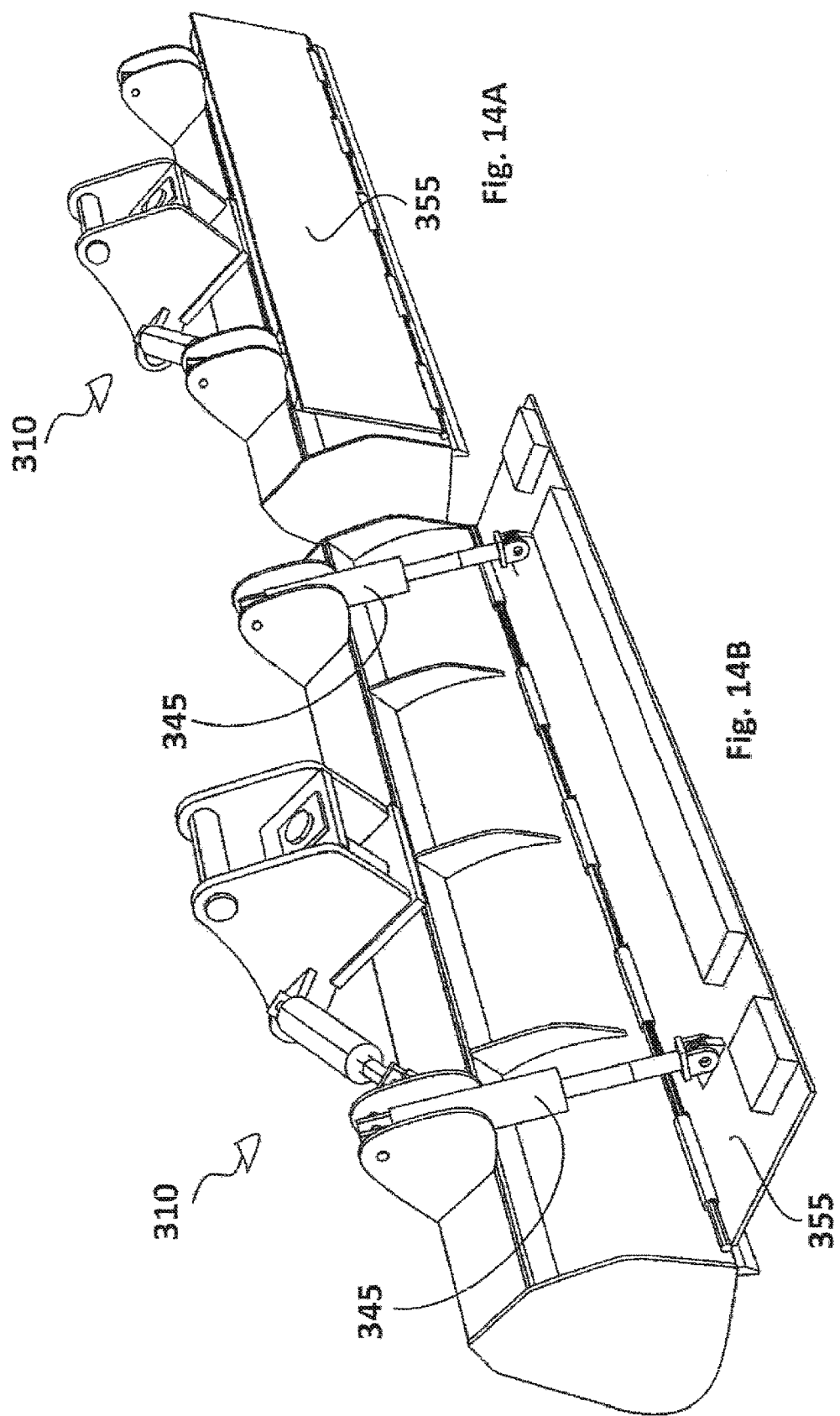
FIG. 14A is a perspective view of a fourth embodiment of the present novel technology, and elongated bucket having an interrupt plate operationally connected thereto.
FIG. 14B is a perspective view of the embodiment of FIG. 14A with the interrupt plate pivoted.

In another embodiment, as shown in FIGS. 14A and 14B, a system 310 is shown wherein hydraulic cylinders 345 are connected to a bucket 350 and may be energized to pivot an interrupt plate 355 pivotably connected thereto, urging the plate 355 into engagement with the ground to maintain controlled contact of the bucket 350 with the ground and ensure a maximum depth of cut. The cylinders 345 are illustrated as positioned in the exterior top portion of the bucket 350. The bucket 350 is illustrated as a wide bucket having an aspect ratio similar to that of a loader or dozer bucket, but may have any convenient shape.

FIGS. 15-21 depict yet another embodiment of the present novel technology, a semi-automatic digging system 400. The system 400 includes a hoe armature assembly 405 defining a first armature member 410 pivotably connected to a tractor chassis 415, a second armature member 420 pivotably connected to the first armature member 410, a third armature member 425 pivotably connected to the second armature member 420, and a bucket 430 pivotably connected to the third armature member 425. A boom piston 435 (boom cylinder, boom hydraulic cylinder, boom hydraulic piston, or, in this case, a first hydraulic actuator) is operationally connected to the chassis 415 and the first armature member 410, a stick piston 440 (stick cylinder, stick hydraulic cylinder, or, in this case, a second hydraulic actuator) is operationally connected to the first and second armature members 410, 420, and a bucket piston 445 (bucket hydraulic cylinder, bucket hydraulic piston, pivot valve, pivot cylinder, or, in this case, a third hydraulic actuator) is operationally connected to the second and third armature members 420, 425. The hydraulic actuators 435, 440, 445 are operationally connected to a hydraulic fluid source (not shown) via hydraulic lines 450.

A valve 460 is operationally connected to the hydraulic lines 450 so as to provide power to the hydraulic actuators 435, 440, 445 and control over the bucket 430. Sensors 465 are operationally connected to an electronic controller 470 and are positioned on the members 410, 420, 425 to yield information regarding the position and motion of predetermined points on the members 410, 420, 425 from which the position, orientation, and/or motion of the bucket 430 may be determined. The electronic controller 470 is connected in electric communication with a display portion 480 and, typically, a joystick or like control interface 485. While the display portion 480 may typically be a screen (e.g., LCD, OLED, etc.) or the like, the system 400 may also use a push button or other input means to indicate and/or input settings or choices. For example, a button may illuminate or pulse green when in operation, red when waiting for confirmation or input, and/or orange when approaching an obstacle. Further, pressing a button in a specific manner may trigger a variety of routines. For example, pressing the button once in a predetermined time period may initiate a first digging/grading sequence, pressing twice may trigger a different sequence, holding down the button may halt operation, etc.

Figure 15:
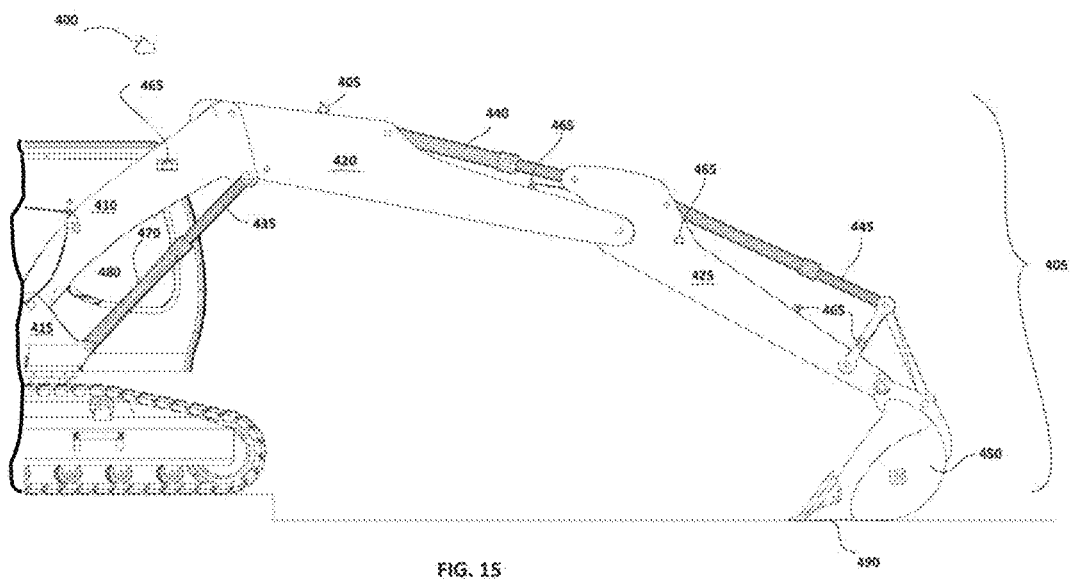
FIG. 15 is a perspective view of a fifth embodiment of the present novel technology, a system for semi-automatic digging control.
Figure 16B:
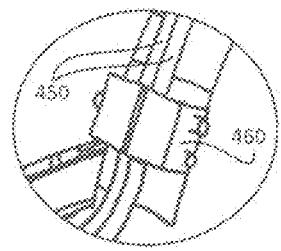
FIG. 16B is an enlarged partial perspective view of FIG. 16A.
Figure 16C:
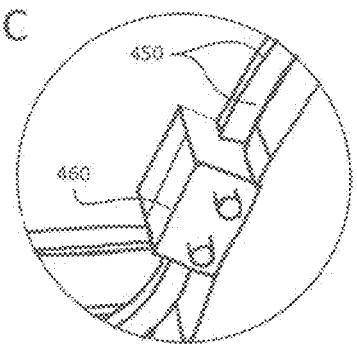
FIG. 16C is an enlarged partial perspective view of FIG. 16C.
Figure 16A:
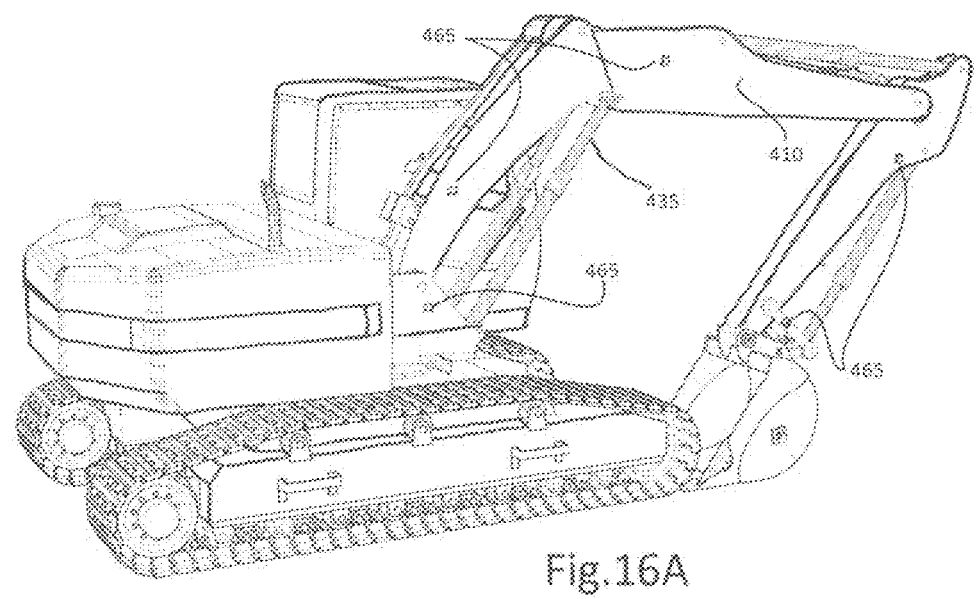
FIG. 16A is a partial perspective view of a track hoe configured according to the embodiment of FIG. 15.
Figure 17:
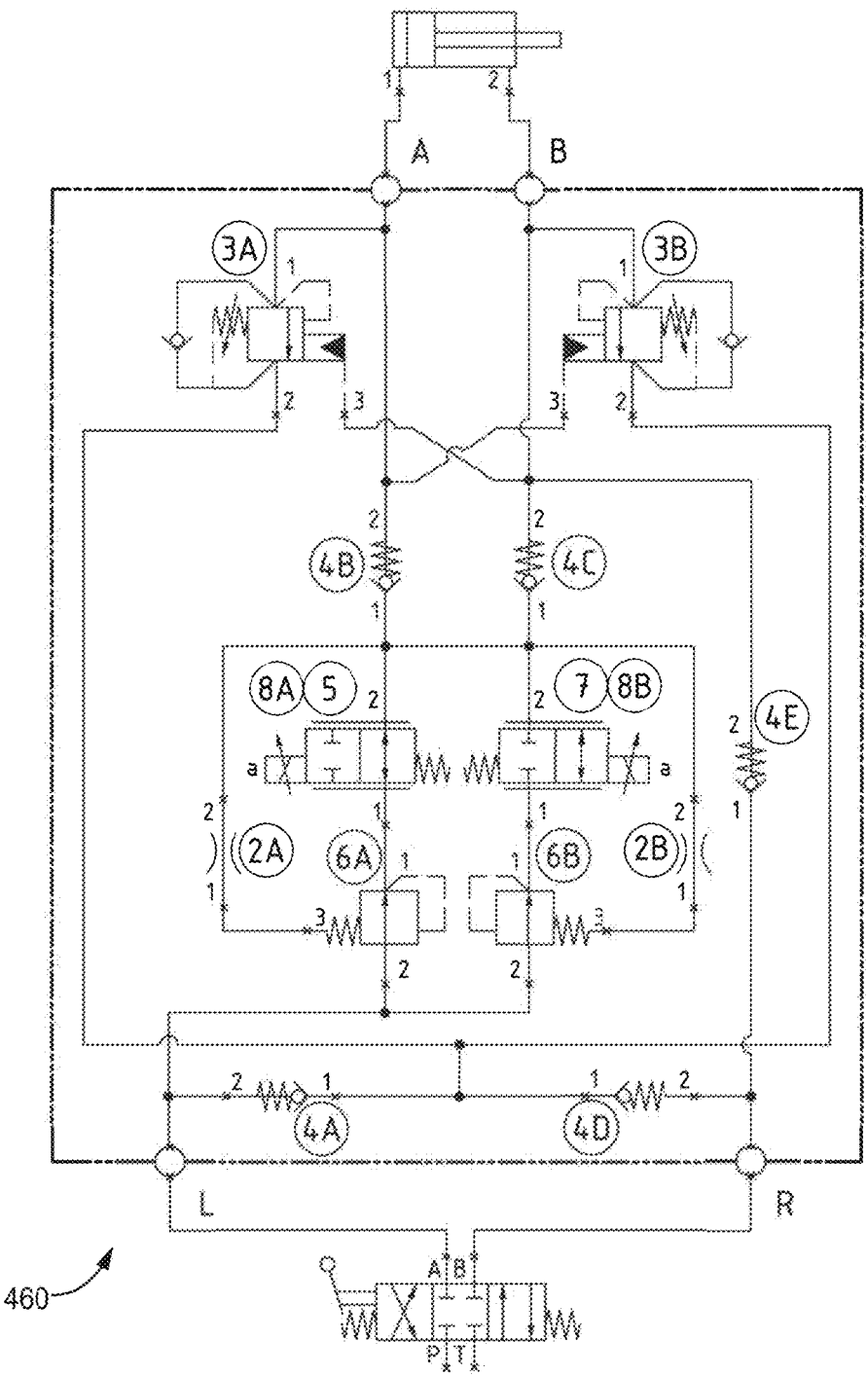
FIG. 17 is a schematic view of the valve of FIG. 16A.
Figures 18A, 18B:
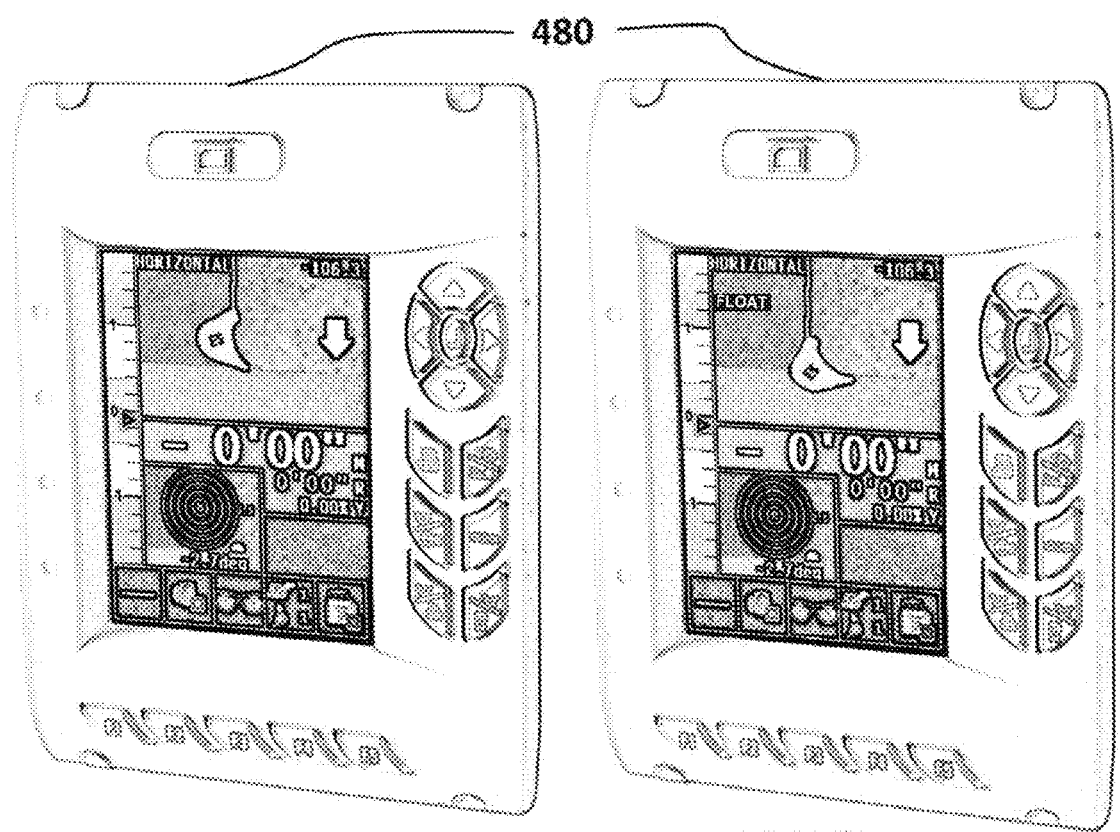
FIG. 18A is a front plan view of a display portion according to the embodiment of FIG. 15.
FIG. 18B is an alternate view of FIG. 18A.
Figure 19:
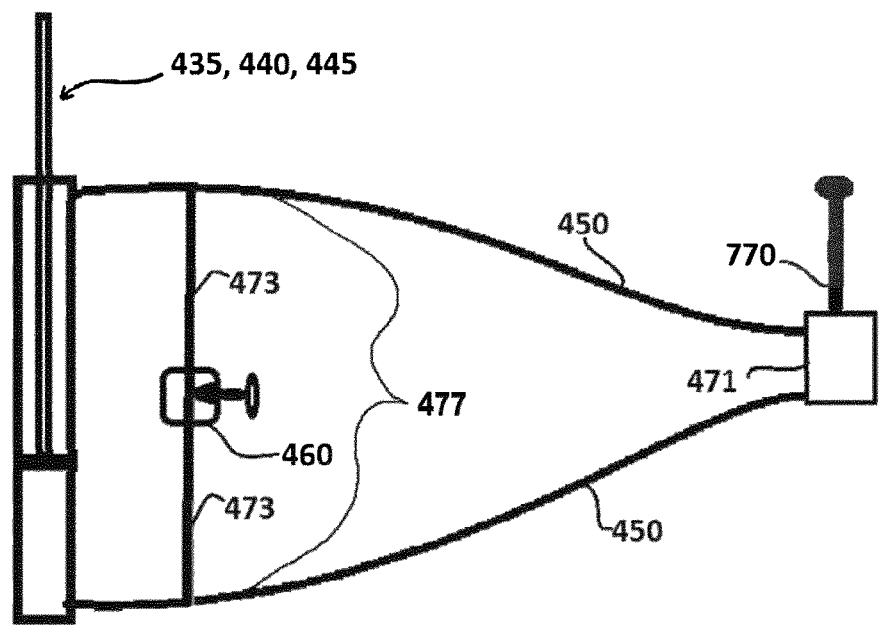
FIG. 19 is a schematic view of the hydraulic plumbing of the boom arm according to several of the above embodiments of the present novel technology.
Figure 20A:
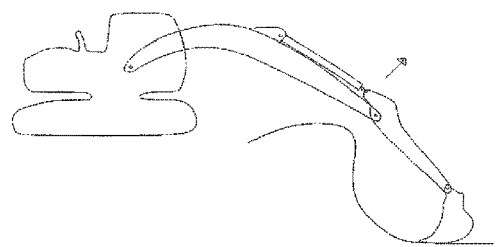
FIG. 20A-E is a series of schematic views of a hoe with the boom arm in 'flex' retracting its bucket up a vertical grade.
Figure 20B:
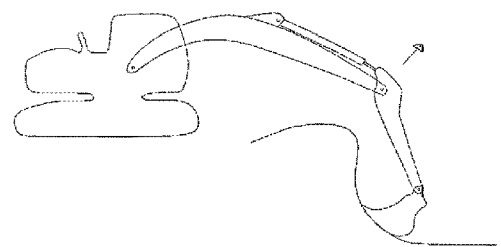
Figure 20C:
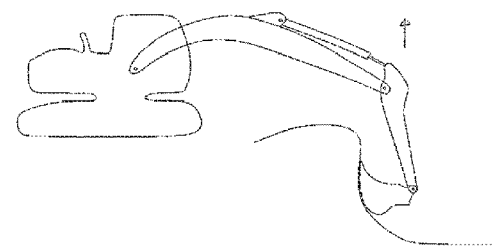
Figure 20D:
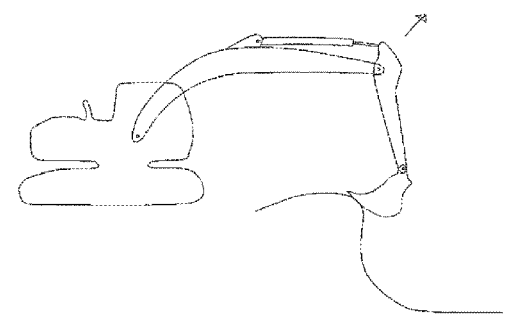
Figure 20E:
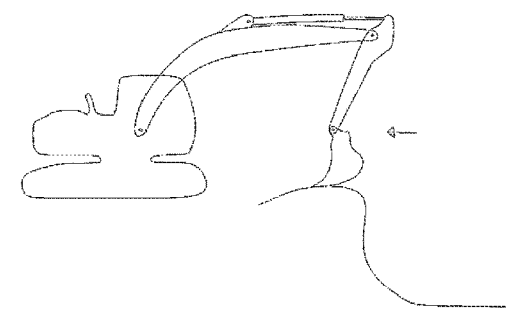
Figures 21A, 21B:
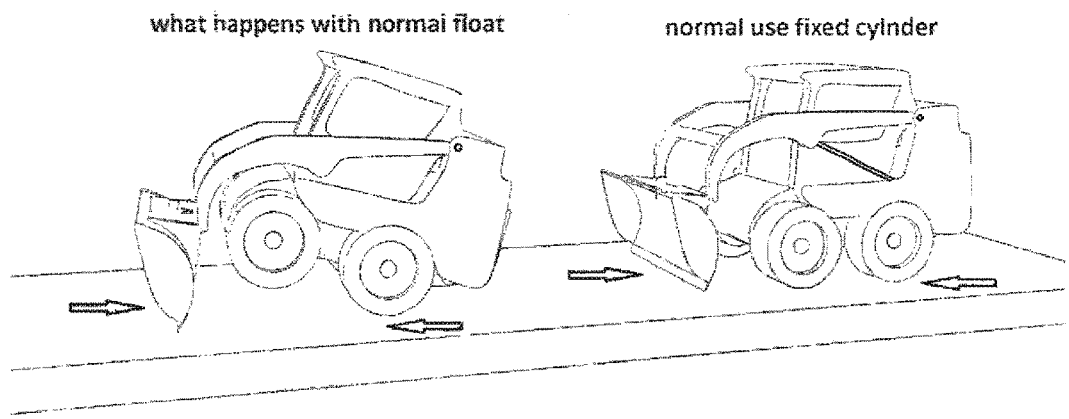
FIG. 21A-B schematically illustrate the differences regarding a skid loader configured for 'flex' or not.

The sensors 465 may be angle sensors, line sensors, accelerometers, inclinometers, gyroscopes, combinations thereof, and/or the like. The sensors 465 may typically be located placed on the bucket 430, the chassis 415, and/or the armature members 410, 420, 425, but they may also be attached to any other fixable point of the digging machine and system 400. The chassis sensor 465 may provide may provide the system 400 with a variety of relative motive and orientative data (e.g., relative X and Y coordinates, longitude, latitude, pitch, tilt, yaw, acceleration, humidity, wind speed, etc.). In some implementations, the sensors 465 (e.g., located on the chassis) may also operate in conjunction or in addition to an external, relative positioning component (e.g., a robotic control station and a robotic control station sensor) to provide location and/or motive data. Typically, the sensors have a lag time of less than 0.4 seconds, more typically less than 0.1 seconds, and still more typically less than 0.05 seconds. The boom (first and/or second members 410, 420) is typically valved to 'flex', while precision bucket control is executed through the bucket cylinder 445. This configuration effectively allows the boom 410, 420 to be partially hydraulically decoupled from the tractor 415 during operation of the stick 425 and bucket 430. In this configuration, the movement of the boom member 410, 420 is dampened, insofar as hydraulic fluid is still circulated to and from the boom cylinder 435, but some of the fluid flow is shunted through hydraulic valve 460 (flex hydraulic valve) using one or more bypass 477 and one or more bypass conduits 473. The piston member(s) 435, 440 remain pressurized to support the boom member(s) 410, 420, but the fluidic inputs 481 on either side of piston members 435, 440 are effectively short circuited. The fluidic inputs 481 typically consist of one or more hydraulic ports (e.g., a first hydraulic port, a second hydraulic port, etc.). In some implementations, the fluidic inputs 481 may act as points of ingress and egress for hydraulic fluid—that is, the first hydraulic port may be a fluidic input port and/or a fluidic output port and the second hydraulic port may be a fluidic outlet port and/or a fluidic input port. The weight of the boom 410, 420 in 'flex' status rests on the bucket 430, urging the bucket 430 downward and allowing digging to be accomplished by control of the stick 425 and the bucket 430. Steering is accomplished by controlling the orientation of the bucket 430 and providing an urging force to move the bucket 430 toward the tractor chassis 415 with the weight of the boom 410, 420 dampening the bucket movement. While the urging of the bucket 430 may typically be toward the chassis 415, the system 400 may also work in by urging the bucket 430 away from the chassis 415. Further, while urging the bucket 430 away from the chassis 415, the bucket 430 may be oriented as illustrated in FIG. 15, or, alternately, in a reversed position, such that the flat portion (bottom with teeth extending therefrom) 490 of the bucket 430 faces away from the chassis 415 as the bucket 430 rests on the earth. Steering control may be performed relative to the bucket 430, instead of being relative to the tractor 415. In one example of this 'flex' valving operation, as will be described in greater detail later, the system 400 may also disable the upward pivoting (curling, closing) of the bucket 430 while maintaining the operability of the downward pivoting (dumping, opening) of the bucket 430 by disabling the upward pivot operation of the bucket cylinder 445. Such a configuration may, for instance, dampen or eliminate counteracting surges of valving, seen as oscillations or shuddering, of the bucket 430. This implementation (balance) might be thought of as 'dropping to' or 'snapping to' a desired grade.

In some implementations, the system 400 may—in addition to or in substitution of disabling the upward pivot operation of the bucket cylinder 445—maintain the upward and downward pivoting ability of the bucket cylinder 445. This may, in some instances, allow for quicker and/or more accurate adjustment of the attachment (e.g., bucket). This implementation ('dig') might be thought of as 'seeking to' or 'searching to' a desired grade.

The electronic controller 470 is programmed to receive input from the sensors 465 and maintain the flat bottomed bucket 430 in a predetermined orientation as it is moved toward the tractor portion 415 as the hydraulic actuators 440, 445 are energized to pivot the members 400, 425 relative to one another. For a horizontal trench, the flat (bottom) portion 490 of the bucket 430 is typically maintained in a horizontal orientation and at the desired grade level as the bucket 430 is pushed toward the tractor chassis 415. This offers the advantage of gaining efficiency by using more of the available stroke of the stick arm 425 for digging and produces a trench relatively free of crumbs, thus requiring less 'clean up' labor.

With the boom members 410, 420 in 'flex', the boom 410 and stick 425 portions may be actuated to operate like scissors. Actuation of the hydraulic cylinder 440 to push against stick portion 425 causes the angle between stick 425 and boom 420 portions to decrease and bucket 430 to move toward tractor portion 415 with dampened boom portion 420 moving upwardly if necessary. As the angle decreases, bucket 430 moves toward tractor 415, even if bucket 430 must traverse obstacles in the way, such as moving up and over a hill or excavation wall. Increasing or decreasing the flow of hydraulic fluid through the valve 445 and the cylinder(s) 435, 440 operates to vary the effective downward force supplied by the boom member(s) 410, 420 onto the bucket 430, effectively increasing or decreasing the weight of the boom 410, 420 as experienced by the bucket 430.

The flat bucket technique typically partially hydraulically decouples one or both boom members 410, 420 from the hydraulic pump to 'flex' and allows four (4) axes of control to be reduced to only one (1) axis of control, enabling computer control of the excavator, although precise control of the bucket 430 may be maintained without the boom 410, 420 in 'flex'. The present novel system 400 employs continuous inputs from at least one sensor 465 operationally connected to the bucket 430 and makes corrections to the bucket 430 to keep the cutting edge level or otherwise oriented relative to a fixed frame of reference, such as true gyroscopic horizontal. However, any desired orientation of the bucket 430 may be selected and maintained, or any predetermined digging profile may be followed. The sensor 465 is typically gyroscopic and is more typically connected to the bucket 430.

The system offers the advantages of reducing new operator learning curve, being able to dig out of the operator's line of sight (e.g., underwater or blocked by earth), utilizing the full stroke of the excavator to significantly reducing the need to reposition machine, thus saving significant time and fuel, and allowing the excavator to run by remote control. In addition, the flat bucket technique provides the ability to hold and follow grade with the tractor in motion, similar to dozer operation. The present novel system 400 added to the dipper stick allows for complex auto-routines and the operator has the ability to follow sculpted, complex three-dimensional surfaces.

Further, while FIGS. 15-21 illustrate a tractor 415 equipped with three armature members 410, 420, 425 and three hydraulic actuators 435, 440, 445, other embodiments using more or less quantities of armature members and/or actuators may be created. In a first example, a backhoe using two armature members—one boom member (e.g., 410) and one stick member (e.g., 425)—may operationally connect and actuate using a valve 435 and a bucket cylinder 425. In a second example, a tractor 415 using four armature members—three boom member (e.g., 410, 420, etc.) and one stick member (e.g., 425)—may operationally connect and actuate using a valve 435, two armature actuators (e.g., 440, etc.), and a bucket cylinder 445. In a third example, a tractor 415 using only one boom member—for example, one that extends slideably from the chassis 415—may operationally connect to a bucket 430 and actuate using a bucket cylinder 425. In a fourth example, the bucket 430 may be attached at the bucket's 430 top to the underside or side of an armature member (e.g., 410), and the angle of bucket may be controlled by actuating a bucket piston that is connected to the chassis 415 (instead of an armature member). In another example, a tractor 415 and/or loader may connect directly or semi-directly (e.g., pivotably) to a bucket 430 without any intervening armature members 410, 420, 425. The bucket 430 may then pivot using a bucket cylinder 430 connected thereto and to the tractor 415, and elevation may be controlled by manipulating the chassis 415 itself (e.g., raising the suspension of the chassis 415) and/or the position and angle of the tractor's 415 wheels.

Additionally, the present novel system of control software and valving may enable the system to "see" through the ground and the system keeps the cutting edge of the bucket 430 on a predetermined trajectory. The bottom of the bucket 430 is controlled to follow a predetermined path through the earth and the cutting edge of the bucket 430 is adjusted to follow a desired predetermined surface contour as it is urged through the earth. When combined with a 3-D control system, the bucket 430 is able to precisely follow the contours of the predetermined 3-D contour.

In some implementations, the system 400 may also include additional actuators to enable tilting of the attachment (e.g., bucket 430) in a diagonal (i.e., roll) fashion. This addition may allow the system 400 to more precisely or more efficiently create, or perform operations on, sloped surfaces. For example, an operator may use such a system 400 with a diagonal tilt to precisely grade a roadside embankment while also maintaining a 40° angle tilt (rolled) orientation. Alternatively, the system 400 may be used to grade a continuous slope for the crown of a roadbed, even when the road is not in a straight line.

In another embodiment of the present novel technology, the plurality of sensors 465 is used in conjunction with the controller 420 and display 480 to simulate "x-ray vision" to provide the operator with the ability to "see" underground and follow the trajectory of the bucket 430. For example, the "x-ray vision" configuration may require input of the depth and/or location of an underground feature, such as a utility or pipe, and thereby sets a marker within the system so that the underground feature and the bucket 430 may be co-located and displayed in real-time. The "x-ray vision" technique permits operators to safely "see" underground and dig around, above, and underneath objects, such as a utility device. If the bucket 430 approaches within a predetermined distance of the underground feature, such as within an inch and a half of the utility, the controller will engage to sound an alarm and disengage and lock the hydraulics to prevent contact between the bucket 430 and the buried feature. This safety mechanism may lock the machine for a predetermined period of time, such as 30 seconds, to allow the operator to re-adjust the bucket 430 and bypass the buried feature. Through the use of machine control "x-ray vision", the operator is able to safely control the bucket 430 to precisely avoid buried obstacles. In some embodiments, the "x-ray vision" technique also utilizes the 3D-modeling embodiment to allow the operator to follow the contours of the 3-D model by viewing the location of both the buried utility and the bucket 430 on the 3-D screen, while also having the back-up safety of the hydraulic lock to safely maneuver around the buried feature. "X-ray vision" thereby increases the operator's speed with no outside assistance.

Another implementation of the system 400 may allow for precise grading while the tractor 415 is in motion. Because the system 400 allows for 'steering' and grading relative to the bucket 430, instead of relative to the tractor 415 (as is currently done), the motion of the tractor 415 is no longer the reference point for a grading system or a grading system operator. For example, if a one-foot-deep, fifty-foot-long, flat grade (relative to sea level) was desired, a traditional back hoe would typically remain stationary, lower the bucket 430 to excavate, curl the sediment up into the bucket 430, raise the bucket 430 from the excavation site, and dump the sediment outside of the excavation site. This process would be repeated many times until the entire fifty-foot grade was complete and would oftentimes result in digging either too shallow (i.e., less than one foot deep, requiring more excavation) or below grade (i.e., greater than one foot deep, requiring refilling). This process is inefficient and uneconomical. Further, the traditional method typically requires an additional indication system or spotter to tell the operator where to dig. The present novel technology allows for the bucket 430 to be lowered, aligned to the desired angle, and then, while remaining in that position, pulled through the substrate as the tractor 415 itself moves backward. The result is an excavation that substantially meets the desired specifications (i.e., one-foot-deep, fifty-feet-long, flat grade), typically eliminates the need for an additional indicator or spotter, and is vastly more efficient and economical than the traditional method. In another example, the bucket 430 may hover just above a substrate (i.e., the operator desires the grade to be at that elevation) and, as the tractor 415 moves forward the bucket 430 grades the substrate at an equal and/or predefined grade. Such a configuration may, for instance, be desirable in creating roadbeds, snow beds, and/or obstacles. In effect, this combination with the system 400 may allow a motive backhoe to act like a traditional loader (e.g., skid loaders, track loaders, wheel loaders, frontend loaders, etc.).

As noted above and illustrated by example in FIGS. 8-9C & 21A-21B, the system 400 may be used in conjunction with more platforms than a backhoe platform. For example, the system 400 may be combined with a loader (e.g., skid loaders, track loaders, frontend loaders, wheel loaders, etc.) to provide more precise and efficient excavation and shaping that might otherwise be accomplished with the platform by itself. This sort of configuration may allow the loader and system 400 combination to act similar to the above-described backhoe in motion.

In some implementations, a loader equipped with the system 400 may grade snow on a surface (e.g., pavement, ski resort, etc.) without damaging the underlying layer of soil and/or pavement as typically occurs with human-operated loaders. Such implementations may also, for instance, be used to shape the snow into elements of greater complexity (e.g., jumps, pipes, etc.) than is presently feasible with a human-operated loader. The substrate, however, may be any substance capable of being loaded or the surface followed by a loader (e.g., soil, rocks, concrete, plant matter, etc.). Thus, for example, a similar system 400 and loader configuration may allow the system 400 to build a motor vehicle track with dirt or like substrates.

In another snow-related example, a loader coupled with the system 400 and equipped with a snow clearing rotary attachment (e.g., a brush/sweeper), may be programmed to remain above the pavement itself, relying on the forces exerted of the moving snow and air to blow snow away from the pavement. Such an implementation may decrease wear on the pavement and the attachment, while allowing the attachment to maintain a higher rotation speed and more quickly clearing the pathway.

In yet another implementation, where an operator needs to perform renovations and/or excavation in a space-limited environment (e.g., a shopping center, a town square, etc.), the operator may use a bucket or frontend loader (in this case a skid loader) in combination with the system 400. In some instances, such excavation may be increasingly difficult due to other infrastructure occupying the limited space (e.g., gas and water lines may be located only a foot beneath the surface). Such conflicting infrastructure may easily be damaged and/or destroyed, resulting in a loss of time and money. In extreme cases, such as damage to a water or sewer line, accidental over-excavation may result in the closing of the entire complex, such as a large shopping mall. However, by incorporating the system 400 into the skid loader the operator can program the system 400, after first breaking apart the surface and/or substrate (e.g., concrete) if necessary with a jackhammer or other like device, to urge the bucket 430 through only the first couple inches of the surface and/or substrate, clearing the rubble and debris. The skid loader and system 400 may remove the substrate incrementally, exposing such infrastructure for controlled deconstruction, removal, and/or protection. The system 400 may also guide the skid loader and/or operator to cease or continue excavation based on the feedback from the sensors 15, 20, 465. For example, the system 400 may use the above-described 'x-ray' functionality to 'sense' a water or sewer pipe, halting operation until the operator instructs the system 400 to continue.

Loaders in combination with the system 400 may additionally be instructed to follow preprogrammed routines (e.g., 3D modeling profiles, geo-coordinate tracking, etc.). For example, a loader with the system 400 may receive a site plan and excavation instructions to level a surface in preparation for a foundation to be laid. The system 400 may then start on one side of the worksite, traversing back and forth until the entire area or a subset of the area is leveled to specification. This entire process may additionally be performed with or without an operator physically present, potentially freeing up the operator to accomplish other work.

In some instances, the loader may also be capable of three-dimensional movement—that is, the loader may move its attachment (e.g., a bucket) vertically, horizontally, and diagonally. Such loaders may be beneficial over traditional loaders for more complex shaping and excavating. The system 400 may further be combined with these 3D-capable loaders to further enhance the precision and programmability of the loader.

Figure 22:
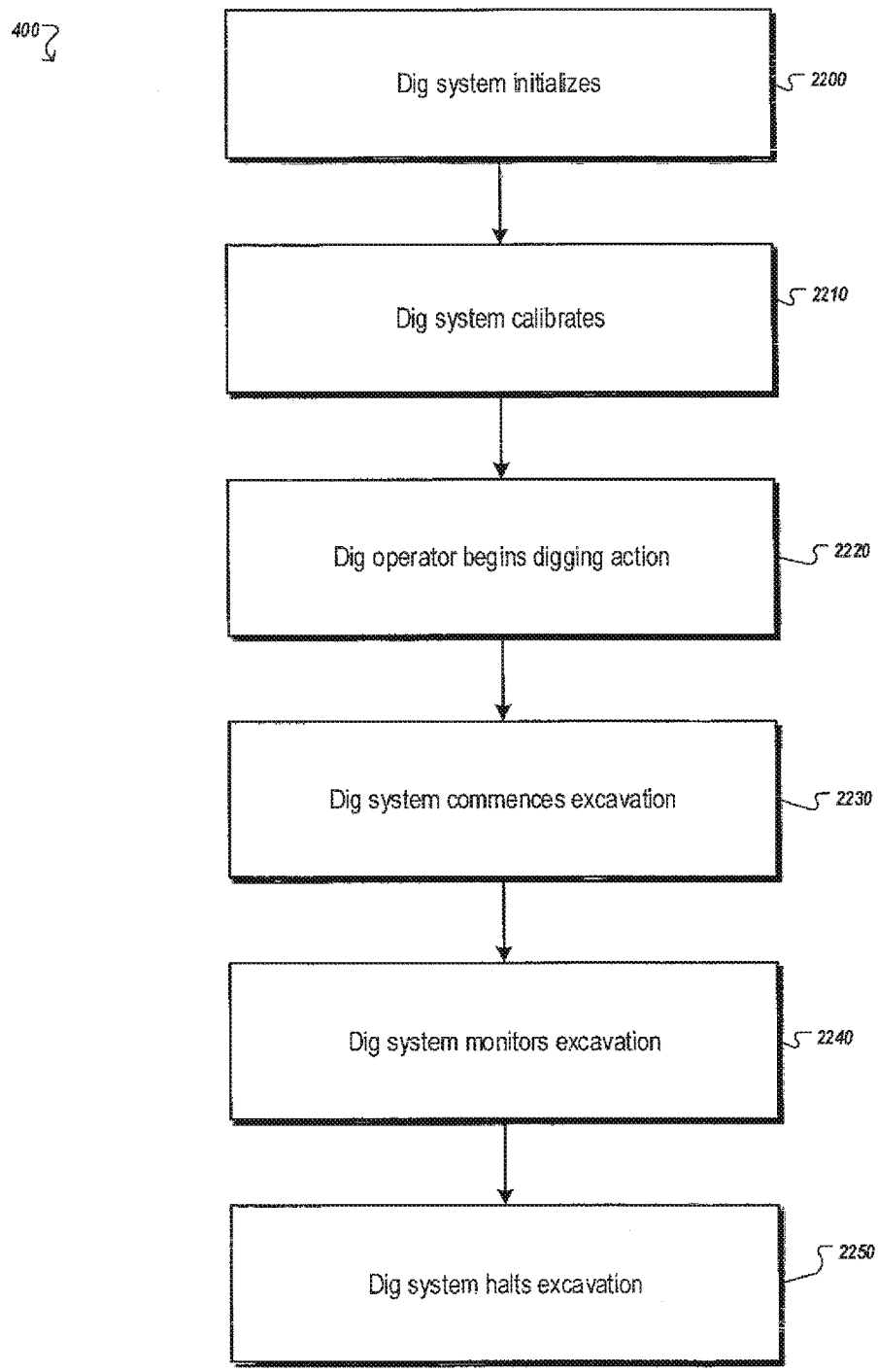
FIG. 22 is a process flow chart associated with the embodiment of FIG. 15.

FIGS. 22-25 illustrate process flows for some embodiments of the present novel technology (e.g., the embodiments shown in FIGS. 15-21). FIG. 22 describes one embodiment of an overall process flow for using the system 400, typically including the steps of the 'dig system initializes' 2200, the 'dig system calibrates' 2210, the 'dig operator begins the digging action' 2220, the 'dig system commences excavation' 2230, the 'dig system monitors excavation' 2240, and the 'dig system halts excavation' 2250. In some instances, these steps may be repeated several times in sequential order, steps may be cyclically performed to reach a threshold, and/or one or more steps may be omitted. For example, if the dig system 400 has already performed the 'dig system initializes' 2200 step, the system 400 may skip this step and/or only perform some of the step's subparts (see FIG. 23, described below). In another example, if the system 400 is performing a grading in multiple iterative steps (for example, to remove different strata levels), the dig system 400 may skip the 'dig system halts excavation' 2250 step and may go immediately back to the 'dig system calibrates' 2210 step. The 'dig system calibrates' 2210 and 'dig system monitors excavation' 2240 steps are further illustrated in FIGS. 23-25.

The 'dig system initializes' 2200 step may typically be performed with a button press or key turn. For example, the operator may press a button or turn an ignition key on the electronic controller 470, display portion 480, and/or the joystick or like control interface 485. However, this step may be alternatively performed manually or automatically through a wireless signal (e.g., from a remote, cell phone, and/or other suitable means), a preset routine (e.g., at a preset time the dig system will turn on and allow the system to warm up and/or calibrate, which may be beneficial to save time on a job site), and/or any other suitable initialization sequence or combination of sequences.

The 'dig operator beings the digging action' 2220 step may typically be performed by the operator pressing a button, inputting a command, pulling a lever, and/or any other operable initialization means. While the operator may typically physically interact with the system 400 to begin the digging action, the operator need not necessarily be at the system 400 at all times. For example, the system 400 may communicate wirelessly to a control room, the operator's personal mobile device, and/or any other means of sending and receiving a query and response. Typically, this step may be thought of as giving the ok to the system to proceed.

The 'dig system commences excavation' 2230 step may typically be thought of as the physical digging actions (i.e., cutting into the substrate, curling or urging the bucket 430 through the substrate, etc.) performed by the bucket 430 and associated components (e.g., the system 400; the boom members 410, 420; the tractor 415; etc.).

The 'dig system halts excavation' 2250 step may typically be performed by the operator or the system 400. For example, if the operator wishes to stop the progress of the bucket's 430 stroke (perhaps to clean debris, an obstacle, and/or for any other reason), the operator may simply give input to the system 400 (e.g., through the electronic controller 470, display portion 480, and/or the joystick or like control interface 485) to stop the movement of the boom members 410, 420 and the bucket 430. The system 400 may also perform this step as part of an action loop or routine and/or at the end of a task. Further, this step may include substeps (not shown) such as extending the boom members 410, 420; lowering and/or retracting the bucket 430; deinitializing the 'flex' valve; and/or any other task or tasks that may be performed by the system 400.

Figure 23:
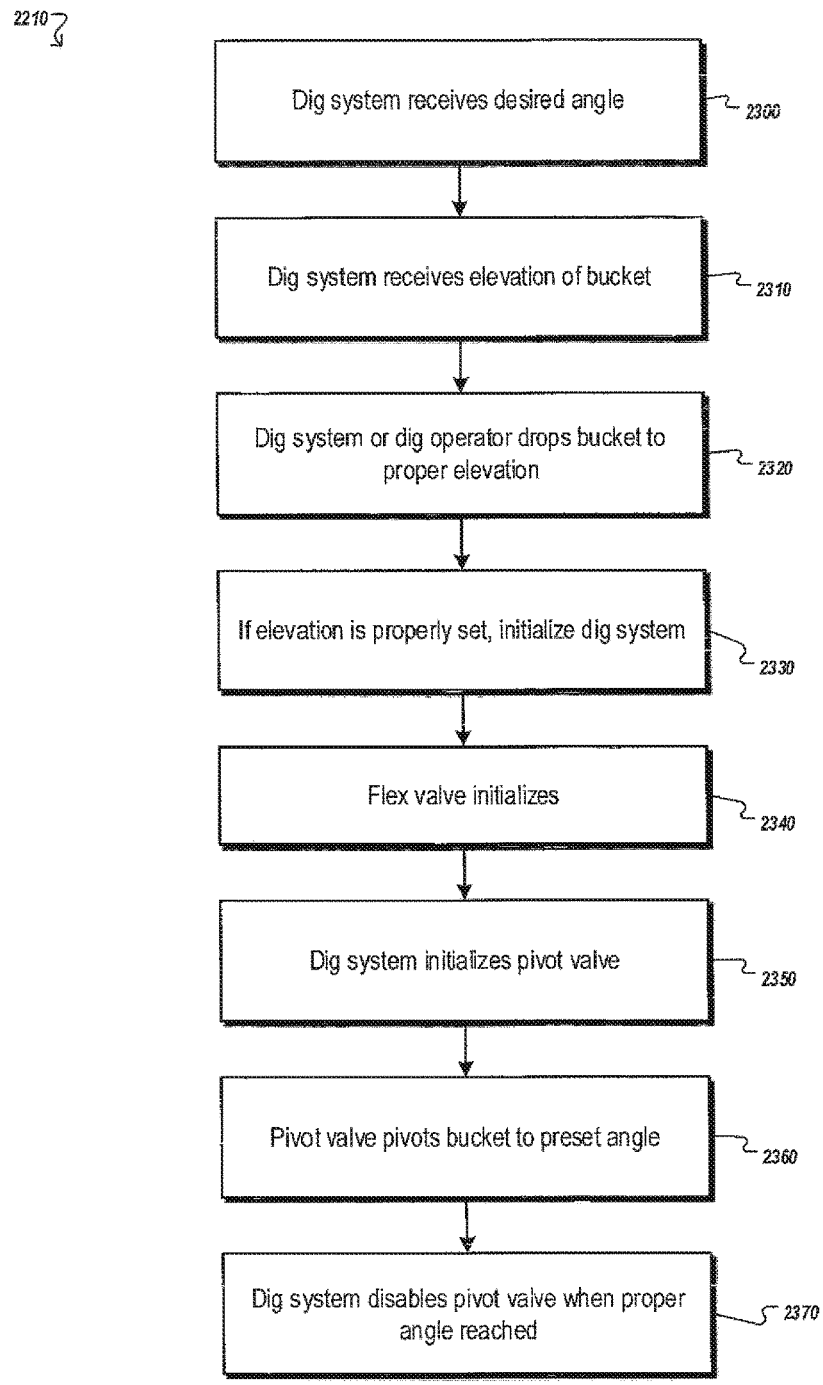
FIG. 23 is a process flow chart of a subpart of the process of FIG. 22.

FIG. 23 describes the subparts of the 'dig system calibrates' 2210 step, as shown in FIG. 22. As described above, the steps described in FIG. 23 may be performed sequentially, cyclically, and/or with one or more skipped steps if the circumstances do not require a step to be performed redundantly. Typically, the 'dig system calibrates' 2210 step may include the subparts (steps, substeps) of the 'dig system receives desired angle' 2300; the 'dig system receives elevation of bucket' 2310; the 'dig system or dig operator brings bucket to proper elevation' 2320; 'if elevation is properly set, initialize dig system' 2330; the 'flex' valve initializes' 2340; the 'dig system enables pivot valve' 2350; the 'pivot valve pivots bucket to preset angle' 2360; and the 'dig system disables pivot valve when proper angle reached' 2370. Subparts (steps, substeps) will be described in greater detail below.

During the 'dig system receives desired angle' 2300 step, the system 400 may receive input from the system 400 and/or operator defining the desired angle for the bucket 430 to excavate. This desired angle (specified angle, predetermined angle) may be, for example zero degrees (relative to sea level), multiple angles to be set at separate points along the excavation (e.g., zero degrees for first ten feet, ten degree incline for the next ten feet, etc.), and/or may be input to the system 400 from a software or an output of a software. For example, a 3D modeling or profiling software may define a complex excavation profile that the system 400 may receive and replicate using its sensors 15, 20, 465 and bucket 430. Typically, the desired angle may be input by the operator through the display portion 480 and/or the joystick or like control interface 485.

For the 'dig system receives elevation of bucket' 2310 step, the system 400 may receive information from the sensors 15, 20, 465 attached to the machine (e.g., on the armature members 410, 420, 425 or chassis 415) and/or bucket 430 to determine the relative elevation of the bucket 430. This gives the system 400 a reference for movement of the bucket 430 relative to the grade desired by the operator. In some implementations, the signals may be sent by electrical communication through wired and/or wireless means to a receiver unit (for example, the electronic controller 470). Further, in some implementations, similar to the above the 'dig system receives desired angle' 2300 step, the operator and/or system 400 may also input and/or set based on a data source a desired elevation (specified elevation, predetermined elevation) for the system 400 to maintain.

Additionally, during the 'dig system or dig operator brings bucket to proper elevation' 2320 step, the system 400 may use the data collected from the sensors 465 to determine whether the bucket 430 is at the proper elevation for grading. This elevation, for example, may be determined by an input device with the operator (e.g., the electronic controller 470, the display portion 480, and/or the joystick or like control interface 485) or through a preset routine or program (e.g., from a 3D-modeling and/or X-ray program). The system 400 and/or operator may then bring the bucket 430 to the proper grading elevation. In some implementations, that elevation may be calculated by using information from sensors 465 to further determine tilt, pitch, and/or yaw, which can aid the system in making the most accurate grade on varied substrates and terrain. Thus, the elevation may be input to the system manually (e.g., on the electronic controller 470 or the display portion 480) and/or automatically calculated and assigned by the system 400.

Further, during the 'if elevation is properly set, initialize dig system' 2330 step, the system 400 may compare the expected elevation value to the value reported by the sensors 465. If the values match and/or are within a margin of error (e.g., a variance of one inch is predetermined as acceptable), the system 400 will initialize for excavation. In some implementations, this initialization may also require confirmation or intervention by the operator, such as on the display portion 480 or the joystick or like control interface 485, and/or may automatically continue through a predefined routine (e.g., the system 400 has plans from a 3D-modeling software and specifications for excavation routines of an area).

During the 'flex valve initializes' 2340 step, the system 400 may enable the valve 460 for 'flex' operation at the acceptable grading elevation. The operation of the valve 460 is described above in this application and is specifically shown in FIG. 16.

For the 'dig system enables pivot valve' 2350 step, the system 400 and/or the operator initialize the pivot valve for operation. This initialization may, for example, occur after the above steps are completed, after some of the above steps are complete, and/or upon confirmation by the operator through any operable input means.

For the 'pivot valve pivots bucket to preset angle' 2360 step, the system 400 may use the data collected from the sensors 15, 20, 465 to determine the relative angle of the bucket 430. Typically, the system 400 may pivot the bucket 430 by enabling the bucket cylinder 445 connected to the bucket 430 so that the flat portion 490 of the bucket 430 is substantially parallel to the grading level. For example, if the desired grade is zero degrees (i.e., flat), but the flat portion 490 of the bucket 430 was at thirty degrees above zero, then the bucket cylinder 445 would lower the bucket to match the desired (zero degree) angle. Alternatively, if the flat portion 490 of the bucket 430 was thirty degrees below the desired (zero degree) angle, the bucket piston 445 would increase the angle of the flat portion 490 of the bucket 430. In some implementations, where it may be advantageous to counter an opposing force (e.g., trying to maintain a zero-degree grade in rocky soil that forces the flat portion 490 of the bucket 430 above the desired grade) or for more constant downward pressure (e.g., if upward corrective actions are faster and/or more efficient), the system 400 and/or operator may angle the flat portion 490 of the bucket 430 at an angle slightly below the desired grade, thus resulting in a substantially null vertical force and more consistently maintaining the desired grade. This downward angling may, in some embodiments, be set automatically based on, for example, a data model created by strata analysis (e.g., coring, ground-penetrating pulse imagery, etc.) that has been input into the system 400. Such counteracting forces may, in many cases, be unnecessary due to the weight of the surrounding soil and material substantially stabilizing the bucket 430 and the flat portion 490 during excavation.

Finally, for the 'dig system disables pivot valve when proper angle reached' 2370 step, the system 400 may compare the desired angle (e.g., zero degrees at the flat portion 490 of the bucket 430) to the received/sensed angle of the flat portion 490 of the bucket 430 and stops the pivot valve 445 when the desired angle is reached. If the system 400 for some reason overshoots or undershoots the desired angle (e.g., due to improper presets, environmental/terrain conditions, etc.), the system 400 may simply reenable the pivot valve 445 to either increase or decrease the angle.

Figure 24:
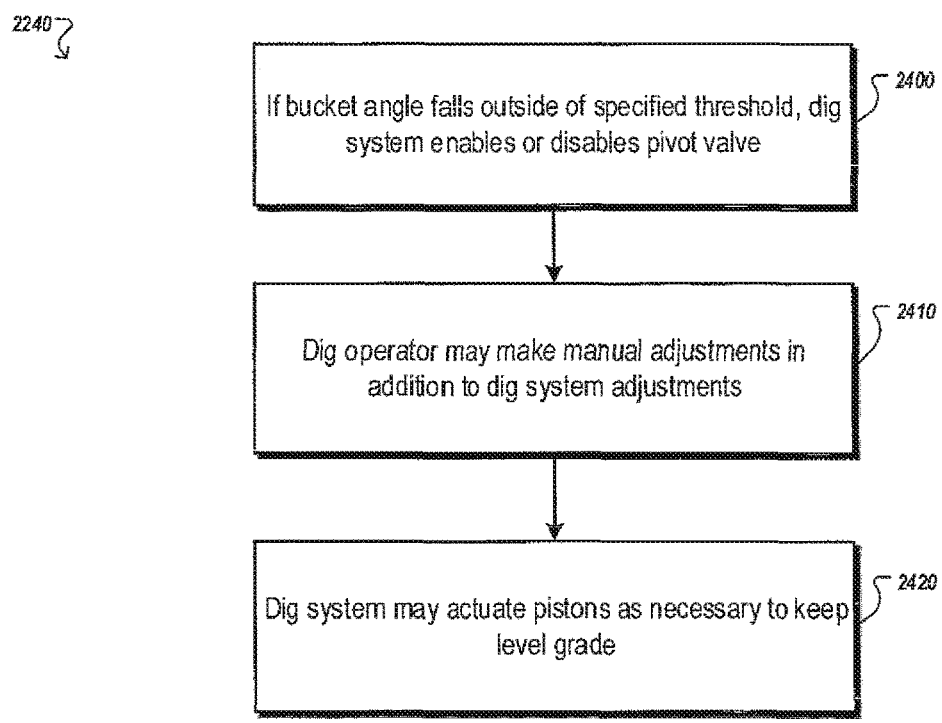
FIG. 24 is a process flow chart of a subpart of the process of FIG. 22.

FIG. 24 illustrates the subparts of the 'dig system monitors excavation' 2240 step, as shown in FIG. 22. As described above, the steps described in FIG. 24 may be performed sequentially, cyclically, and/or with one or more skipped steps if, for instance, the circumstances do not require a step to be performed redundantly. Typically, the steps include 'if bucket angle falls outside of specified threshold, dig system enables or disables the pivot valve' 2400; the 'dig operator may make manual adjustments in addition to dig system adjustments' 2410; and the 'dig system may actuate pistons as necessary to maintain desired grade' 2420. Subparts (steps, substeps) will be described in greater detail below.

During the 'if bucket angle falls outside of specified threshold, dig system enables or disables the pivot valve' 2400 step, the system 400 may, in some implementations, monitor the flat portion 490 of the bucket's 430 angle using sensors 15, 20, 465 and compares the detected angle with a desired angle. If the detected angle deviates outside of the desired angle, the system 400 enables or disables the pivot valve 445 to raise or lower the angle of the flat portion 490 of the bucket 430. As described above, if the system 400 overshoots or undershoots the desired angle, bucket cylinder 445 may increase or decrease the angle of the flat portion 490 of the bucket 430 until the detected angle is equal to, or within a margin of error of, the desired angle.

Further, for the 'dig operator may make manual adjustments in addition to dig system adjustments' 2410 step, an operator may manually intervene to make adjustments to the system 400. These adjustments may be made, for example, through the display portion 480 and/or the joystick or like control interface 485. This may be necessary, for example, where certain environmental or terrain factors have compromised the integrity of all or part of an excavation operation. For example, a recent precipitation event may have weakened soil consistency such that debris from the side of the excavation side falls into the excavated area, making one or more additional passes of the bucket 430 necessary to achieve the desired grade. Alternatively, if the system 400 was, for example, used during a dredging operation from a barge after a recent deluge or where the sediment bed was subject to refilling after excavation, the system 400 may perform repeated excavation passes, with varying speed, at different angles, and/or with different attachments to minimize created debris and/or effort that may otherwise be wasted with conventional dredging techniques.

Further, in some implementations, the system 400 may allow for multiple, repeated actions to be performed with simplified input from the operator. For example, the display portion 480 may include buttons or selections allowing a one-touch sequence of actions. For instance, pressing a button labeled "Drop and Level" might lower the bucket 430 and set the flat portion 490 of the bucket 430 to the excavation surface, while "Quick Pull Pass" might lower the bucket 430, set the angle as above, and then move the machine to the rear, quickly excavating the desired grade instead of making repeated lower, level, pivot/curl, and lift steps. These quick-actions would reduce operator fatigue and the lag between operations, increasing productivity and decreasing costs (such as fuel consumption and hours of labor). These implementations may, of course, be used outside of the 'dig operator may make manual adjustments in addition to dig system adjustments' 2410 step as well, but these examples help illustrate some manual interventions that an operator may perform during an otherwise automated or semi-automated excavation operation.

Finally, for the 'dig system may actuate pistons as necessary to maintain desired grade' 2420 step, the system 400 may activate hydraulic actuators 435, 440, 445 to pivot the armature members 410, 420, 425 and bring the bucket 430 toward the chassis 415. As the hydraulic actuators 435, 440, 445 pivot the armature members 410, 420, 425, the flat portion 490 of the bucket 430 would, without the intervention of the system 400 and sensors 465, deviate from the desired elevation and angle. The system 400 acts to respond to the sensors 465 and maintain the desired elevation and angle to result in a consistent grade. For example, as the first hydraulic actuator (boom cylinder) 435 contracts the bucket 430 may rise, which would be detected by the sensors 465 and communicated to the electronic controller 470. The electronic controller 470 may then actuate the second hydraulic actuator 440 and the bucket cylinder 445 to keep the flat portion 490 of the bucket 430 at the desired grade. Effectively, the system 400 detects changes through the sensors 465 and compensates automatically to maintain the grade of the excavation, instead of requiring constant operator adjustment and intervention.

Figure 25A:
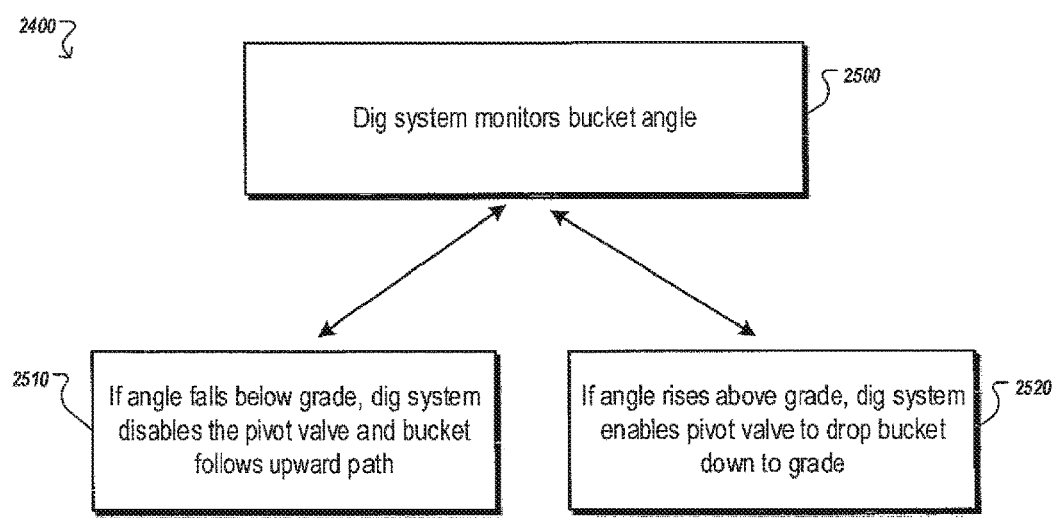
FIG. 25A is a process flow chart of a subpart of the process of FIG. 24 illustrating the system during fine grading.
Figure 25B:
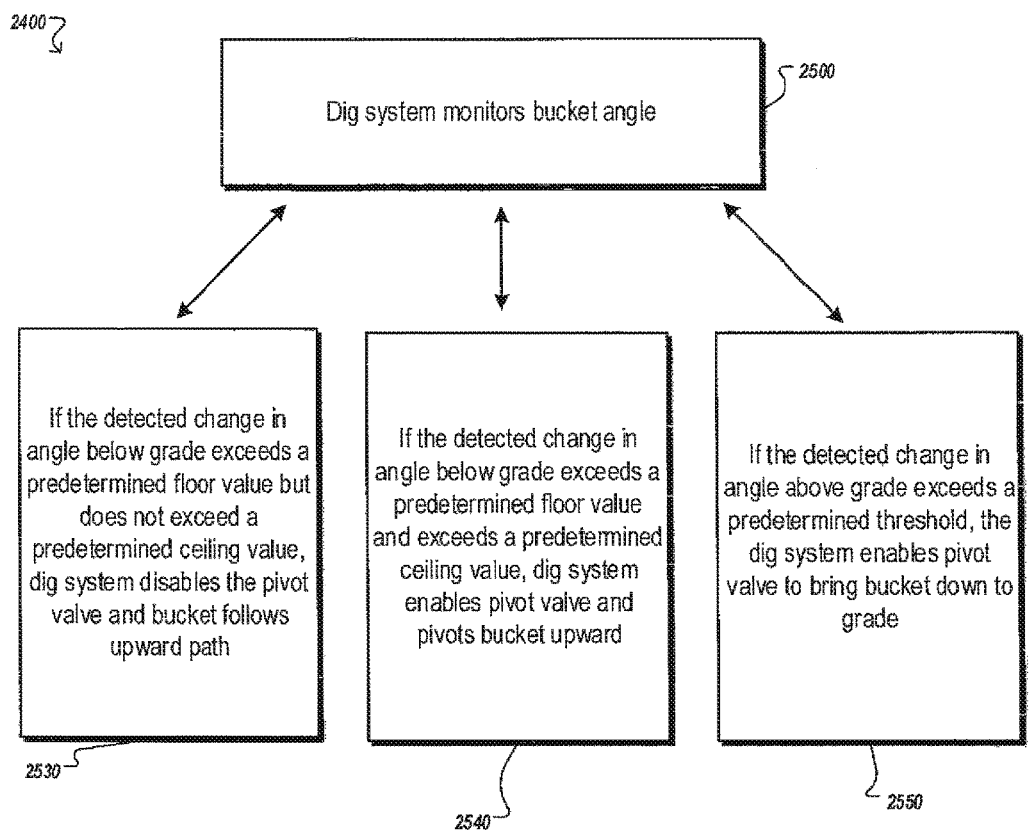
FIG. 25B is a process flow chart of a subpart of the process of FIG. 24 illustrating the system during course grading.

FIGS. 25A & 25B describes the subparts (steps, substeps) of the 'if bucket angle falls outside of specified threshold, dig system enables or disables the pivot valve' 2400 step, as shown in FIG. 24. As described above, the steps described in FIGS. 25A & 25B may be performed sequentially, cyclically, and/or with one or more skipped steps if, for example, the circumstances do not require a step to be performed redundantly. FIG. 25A illustrates a fine grading correction as might be experienced when attempting to excavate at a consistent grade (e.g., excavating a flat plane at zero degrees, relative to sea level, for a home's basement), Typically, the subparts of 25A include the steps of 'dig system monitors bucket angle' 2500; 'if angle falls below grade, dig system disables and bucket follows upward path' 2510; and 'if angle rises above grade, dig system enables pivot valve to bring bucket down to grade' 2520. Subparts (steps, substeps) will be described in greater detail below.

During the 'dig system monitors bucket angle' 2500 step, the system 400 detects changes in the angle of the bucket 430, typically at and/or along the flat portion 490 and/or computed based on reference locations along the machine (e.g., armature members 410, 420, 425). As described above, the sensors 465 then communicate these readings to a receiver (e.g., the electronic controller 470), which may then report, display, and/or act upon the sensed readings. If the readings are equal to, or fall within an acceptable margin of error of, the angle, the system 400 need not take any corrective action. If, however, the system 400 detects that the angle of the bucket 430 is not equal to, or within an acceptable margin of error of, the angle, the system 400 may take corrective action by enabling or disabling all, part, or parts of the system 400.

For the 'if angle falls below grade, dig system disables and bucket follows upward path' 2510, the system 400 has, for example, detected that the flat portion 490 of the bucket 430 has dropped below the desired grade. Typically, the system 400 may disengage and/or disable all, part, or parts of the system 400 so that the bucket 430 is no longer kept at the below-grade angle. In practice, this may either stop excavation while corrections are made by the operator and/or system 400 to bring the flat portion 490 of the bucket back to the desired angle or the bucket 430 continues along its excavation path but is forced upwards by the material to be excavated. For the latter of the two above examples, the weight exerted downward by the armature members 410, 420, 425 and the system 400 upon the bucket 430 is removed from the excavation scenario, resulting in the bucket 430 following an upward path toward the excavation surface (and back toward the desired angle and grade). As the bucket 430 and the flat portion 490 rise above the previously detected angle, the system 400 monitors the bucket 430 angle and reengages or reenables to maintain and/or return to the desired grade and/or angle. In some cases, this process may include cycling through all three steps illustrated on FIG. 25 to correct for changes to the angle and/or grade caused by changes in the terrain and/or strata and detected by the sensors 465. Additional, as described above, the system 400 may also perform a 'searching to' valve operation using both upward and downward pivots instead of the above described 'dropping to' operation if that is preferable.

Finally, during the 'if angle rises above grade, dig system enables pivot valve to bring bucket down to grade' 2520 step, the system 400 typically actuates the pivot valve 445 to lower the flat portion 490 of the bucket 430 to the desired angle. This may, for example, occur because the strata is exerting a greater upward force than is being exerted by the system 400 and/or operator. The system 400, similar to described above (but in an opposite direction), monitors the sensors 465 and brings the angle back to the desired angle threshold. Also as described above, in some cases this process may include cycling through all three steps illustrated on FIG. 25 to correct for changes to the angle and/or grade caused by changes in the terrain and/or strata and detected by the sensors 465.

FIG. 25B illustrates a case in which the change in the angle differs from the desired angle at a greater amount than is typically correctable through the fine grading corrections of FIG. 25A. Thus, FIG. 26B illustrates when course changes to the angle of the bucket 430 by the system 400 are detected and enacted. Typically, the subparts of 25B include the steps of 'dig system monitors bucket angle' 2500; 'if the detected change in angle below grade exceeds a predetermined floor value but does not exceed a predetermined ceiling value, dig system disables and bucket follows upward path' 2530; 'if the detected change in angle below grade exceeds a predetermined floor value and exceeds a predetermined ceiling value, dig system enables pivot valve and pivots bucket upward' 2540; and 'if the detected change in angle above grade exceeds a predetermined threshold, the dig system enables pivot valve to bring bucket down to grade' 2550. Subparts (steps, substeps) will be described in greater detail below.

During the 'dig system monitors bucket angle' 2500 step, as described above the system 400 detects changes in the angle of the bucket 430, typically at and/or along the flat portion 490 and/or computed based on reference locations along the machine (e.g., armature members 410, 420, 425). The sensors 15, 20, 465 then communicate these readings to a receiver (e.g., the electronic controller 470), which may then report, display, and/or act upon the sensed readings. If the readings are equal to, or fall within an acceptable margin of error of, the angle, the system 400 need not take any corrective action. If, however, the system 400 detects that the change in the angle of the bucket 430 falls outside of a predetermined threshold the system 400 may take corrective action by enabling or disabling all, part, or parts of the system 400. For example, as the system 400 transitions from a flat (relative to sea level) grade to a forty-degree incline, this may not be easily corrected by disabling the pivot valve 445. Alternatively, a transition from a forty-degree incline to a forty-degree decline is may not be easily corrected by the fine corrections illustrated in FIG. 25A. The following thus illustrates how differing changes in angle (i.e., the differential of the angle) may be corrected for by the system 400 to maintain the desired grade.

For the 'if the detected change in angle below grade exceeds a predetermined floor value but does not exceed a predetermined ceiling value, dig system disables and bucket follows upward path' 2530 step, the system 400 has, for example, detected that the angle of the flat portion 490 of the bucket 430 has dropped below the desired angle. The predetermined floor value may be, for example, $1°/second^2$ (one degree per second per second), and the predetermined ceiling value may be $5°/second^2$. If the sensors 15, 20, 465 detect a rate of angle change of $3°/second^2$, then the system 400 may disable the pivot valve 445 and allow the bucket 430 to follow the upward path created by the movement of the bucket 430 relative to the boom members 410, 420. This may, for instance, occur when the bucket 430 transitions from a flat angle (i.e., zero degrees relative to sea level) grade to a grade of an incline of ten-degrees. Additional, as described above, the system 400 may also perform a 'searching to' valve operation using both upward and downward pivots instead of the above described 'dropping to' operation if that is preferable.

Alternatively, during the 'if the detected change in angle below grade exceeds a predetermined floor value and exceeds a predetermined ceiling value, dig system enables pivot valve and pivots bucket upward' 2540 step, the system 400 has, for example, detected that the angle of the flat portion 490 of the bucket 430 has dropped below the desired angle. The predetermined floor value may again be, for example, $1°/second^2$ (one degree per second per second), and the predetermined ceiling value may be $5°/second^2$. If the sensors 15, 20, 465 detect a rate of angle change of $10°/second^2$, then the system 400 may enable the pivot valve 445 to urge the bucket 430 upward, rapidly bringing the angle of the bucket 430 to the desired angle. This may, for instance, occur when the bucket 430 transitions from a flat angle (i.e., zero degrees relative to sea level) grade to a grade of an incline of forty-five-degrees. Again, the system 400 may also perform a 'searching to' valve operation using both upward and downward pivots instead of the above described 'dropping to' operation if that is preferable.

Finally, during the 'if the detected change in angle above grade exceeds a predetermined threshold, the dig system enables pivot valve to bring bucket down to grade' 2550 step, the system 400 has, for example, detected that the angle of the flat portion 490 of the bucket 430 has increased above the desired angle. The predetermined floor value may again be, for example, $1°/second^2$ (one degree per second per second), and the predetermined ceiling value may be $5°/second^2$. If the sensors 15, 20, 465 detect a rate of angle change of $-10°/second^2$, then the system 400 may enable the pivot valve 445 to urge the bucket 430 downward (pivot down, dumping), rapidly bringing the angle of the bucket 430 down to the desired angle. This may, for instance, occur when the bucket 430 transitions from a grade of an incline of fifty-degrees to a flat angle (i.e., zero degrees relative to sea level) grade. Once again, the system 400 may perform a 'searching to' valve operation using both upward and downward pivots instead of the above described 'dropping to' operation if that is preferable.

Figure 26:
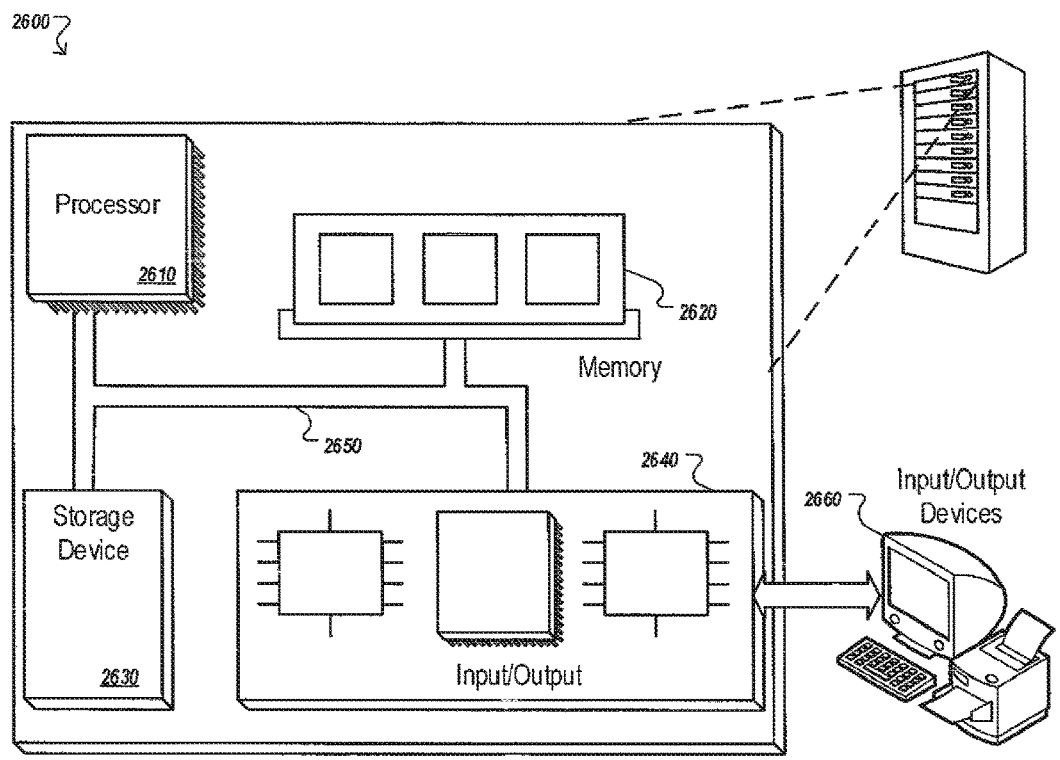
FIG. 26 is a schematic diagram of an example computer system that may run the present novel technology.

FIG. 26 is a schematic diagram of an example computer system 2600 that may run the digging system 400, as described above. The system 2600 includes a processor 2610, a memory 2620, a storage device 2630, and an input/output device 2640. Each of the components 2610, 2620, 2630, and 2640 may be interconnected, for example, using a system bus 2650. The processor 2610 is capable of processing instructions for execution within the system 2600. In one implementation, the processor 2610 may be a single-threaded processor. In another implementation, the processor 2610 may be a multi-threaded processor. The processor 2610 is capable of processing instructions stored in the memory 2620 or on the storage device 2630.

The memory 2620 stores information within the system 2600. In one implementation, the memory 2620 is a computer-readable medium. In one implementation, the memory 2620 is a volatile memory unit. In another implementation, the memory 2620 is a nonvolatile memory unit.

The storage device 2630 is capable of providing mass storage for the system 2600. In one implementation, the storage device 2630 is a computer-readable medium. In various different implementations, the storage device 2630 may include, for example, a hard disk device, an optical disk device, and/or some other large capacity storage device. In some implementations, the storage device 2630 may contain 3D-modeling data, routines, past excavation statistics, and/or any other beneficial data for use with the system 400.

The input/output device 2640 provides input/output operations for the system 2600. In one implementation, the input/output device 2640 may include one or more network interface devices, for example an Ethernet card; a serial communication device, for example an RS-232 port; and/or a wireless interface device, for example an 802.11 card. In another implementation, the input/output device may include driver devices configured to receive input data and send output data to other input/output devices, for example keyboard, printer and display devices 2660. Other implementations, however, may also be used, such as mobile computing devices, mobile communication devices, set-top box television client devices, etc. Such input/output devices may include in the present novel technology, but is not limited to, the electronic controller 470 and/or the joystick or like control interface 485.

Although an example processing system has been described in FIG. 26, implementations of the subject matter and the functional operations described in this specification may be implemented in other types of digital electronic circuitry, and/or in computer software, firmware, and/or hardware, including the structures disclosed in this specification and their structural equivalents, and/or in combinations of one or more of them.

Embodiments of the subject matter and the operations described in this specification may be implemented as a method, in digital electronic circuitry, and/or in computer software, firmware, and/or hardware, including the structures disclosed in this specification and their structural equivalents, and/or in combinations of one or more of them. Embodiments of the subject matter described in this specification may be implemented as one or more computer programs—that is, one or more modules of computer program instructions encoded on computer storage medium for execution by, and/or to control the operation of, data processing apparatus. Alternatively or in addition, the program instructions may be encoded on an artificially-generated propagated signal, for example a machine-generated electrical, optical, and/or electromagnetic signal, which is generated to encode information for transmission to suitable receiver apparatus for execution by a data processing apparatus. A computer storage medium may be, and/or be included in, a computer-readable storage device, a computer-readable storage substrate, a random or serial access memory array or device, and/or a combination of one or more of them. Moreover, while a computer storage medium is not a propagated signal, a computer storage medium may be a source or destination of computer program instructions encoded in an artificially-generated propagated signal. The computer storage medium may also be, and/or be included in, one or more separate physical components or media (e.g., multiple CDs, disks, and/or other storage devices).

The operations described in this specification may be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, and/or multiple ones, and/or combinations, of the foregoing. The apparatus may include special purpose logic circuitry, for example an FPGA (field programmable gate array) or an ASIC (application-specific integrated circuit). The apparatus may also include, in addition to hardware, code that creates an execution environment for the computer program in question, for example code that constitutes processor firmware, a protocol stack, a database management system, an operating system, a cross-platform runtime environment, a virtual machine, and/or a combination of one or more of them. The apparatus and execution environment may realize various different computing model infrastructures, such as web services, distributed computing, and/or grid computing infrastructures.

A computer program (also known as a program, software, software application, script, and/or code) may be written in any form of programming language, including compiled or interpreted languages, declarative or procedural languages, and it may be deployed in any form, including as a stand-alone program or as a module, component, subroutine, object, and/or other unit suitable for use in a computing environment. A computer program can, but need not, correspond to a file in a file system. A program may be stored in a portion of a file that holds other programs or data (e.g., one or more scripts stored in a markup language document), in a single file dedicated to the program in question, and/or in multiple coordinated files (e.g., files that store one or more modules, sub-programs, and/or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform actions by operating on input data and generating output. The processes and logic flows may also be performed by, and apparatus may also be implemented as, special purpose logic circuitry, for example an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, and/or be operatively coupled to receive data from or transfer data to, or both, one or more mass storage devices for storing data, e.g., magnetic, magneto-optical disks, and/or optical disks. However, a computer need not have such devices. Moreover, a computer may be embedded in another device, for example a mobile telephone, a personal digital assistant (PDA), a mobile audio or video player, a game console, a Global Positioning System (GPS) receiver, and/or a portable storage device (e.g., a universal serial bus (USB) flash drive), to name just a few. Devices suitable for storing computer program instructions and data include all forms of nonvolatile memory, media and memory devices, including by way of example semiconductor memory devices, for example EPROM, EEPROM, and flash memory devices; magnetic disks, for example internal hard disks or removable disks; magneto-optical disks; and CD-ROM and DVD-ROM disks. The processor and the memory may be supplemented by, and/or incorporated in, special purpose logic circuitry.

To provide for interaction with a user, embodiments of the subject matter described in this specification may be implemented on a computer having a display device, e.g., a CRT (cathode ray tube) or LCD (liquid crystal display) monitor, for displaying information to the user and a keyboard and a pointing device, e.g., a mouse or a trackball, by which the user may provide input to the computer. The display device and the input device may also be combined, such as with a pressure-sensitive or capacitive touch screen display. Other kinds of devices may be used to provide for interaction with a user as well; for example, feedback provided to the user may be any form of sensory feedback, for example visual feedback, auditory feedback, and/or tactile feedback; and input from the user may be received in any form, including acoustic, speech, and/or tactile input. In addition, a computer may interact with a user by sending documents to and receiving documents from a device that is used by the user; for example, by sending web pages to a web browser on a user's client device in response to requests received from the web browser. For example, the system 400 may send status updates to a user's smartphone in the event of an issue with an excavation operation and/or receive confirmation to commence/resume an excavation operation.

Some embodiments of the subject matter described in this specification may be implemented in a computing system that includes a back-end component (e.g., a data server,) or that includes a middleware component (e.g., an application server,) or that includes a front-end component (e.g., a client computer having a graphical user interface or a Web browser through which a user may interact with an implementation of the subject matter described in this specification) or any combination of one or more such back-end, middleware, and/or front-end components. The components of the system may be interconnected by any form or medium of digital data communication, for example a communication network. Examples of communication networks include a local area network ("LAN"), a wide area network ("WAN"), an inter-network (e.g., the Internet), and peer-to-peer networks (e.g., ad hoc peer-to-peer networks).

The computing system may include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (i.e., a result of the user interaction) may be received from the client device at the server.

Some examples for operating and/or steering the system 400 are described hereafter. In one example (hereinafter "example 1"), the system 400 initializes and calibrates as describes above, a digging angle and/or routine is defined, the 'flex' valve initializes, the bucket 430 is lowered, the bucket 430 pivots upward (curls) past the desired angle for grading, the bucket 430 then pivots downward (dumps) back to the desired angle for grading, and the pivot valve 445 disables the upward pivot (curl) operation while keeping the downward pivot (dump) operation functional. This dampens or eliminates oscillations of the bucket member that would otherwise be caused by having both dump and curl valving operations functional. Next, as the operator and/or system urged the boom 410, 420 and bucket 430 towards the tractor 415, the angle of the flat portion 490 of the bucket 430 automatically increases. This automatic increase is due to the relative motion of the bucket 430 to the boom members 410, 420, such that as the bucket 430 moves towards the tractor 415 the bucket 430 naturally continues in an angle increasing path (this angle might be thought of as a concentric circle created by the relative motion of the armature members 410, 420, 425 and the connected bucket 430). To account for this increase in angle, the pivot valve 445 pivots the bucket 430 downward (dumping) back to the desired angle (which is typically the desired grade). This increase in angle and subsequent pivoting back to grade typically keeps the flat portion 490 of the bucket 430 substantially at the desired angle and grade during the length of urging the bucket 430 toward the tractor 415. In some implementations, this operation may be triggered and/or run automatically by the system 400 and/or may be triggered manually by the operator (e.g., using the display portion 480 and/or the joystick or like control interface 485). Typically, this operation uses one sensor (e.g., the position sensor 15); however, one or more sensors (e.g., 15, 20, 465) may be used in combination as well.

In another example (hereinafter "example 2"), the system 400 performs the same steps as in example 1, up to the point before the operator or system 400 being urging the boom 410, 420 and bucket 430 toward the tractor 415. Instead, a second throttle is initialized (not shown) and a second throttle value is defined such that the downward pivot of the bucket 430 is continuously engaged. The bucket 430 is then urged toward the tractor 415 as before, but now, if the angle of the flat portion 490 of the bucket 430 drops below the desired angle, then the pivot valve 445 reenables its upward pivot operation and pivots the bucket 430 upward (curling). This upward pivot brings the bucket back to the desired angle (typically the desired grade). Further, the pivot valve 445 may disable and, as described above, the angle will automatically increase as the boom 410, 420 urges the bucket 430 toward the tractor 415. Once the bucket 430 angle is again at grade the system 400 may once again pivot the bucket 430 downward. This cycle of angling downward, curling, disabling, and pivoting may loop as many times as needed during the excavation stroke or strokes. As above, typically one sensor (e.g., the position sensor 15) is needed for this operation, but one or more may be used. This example may also for a quicker adjustment of the bucket angle and/or excavation.

In a further example (hereinafter "example 3"), vertical 'steering' and/or excavation is improved. The system 400 typically uses several sensors (e.g., 15, 20, 465) to enable calculation of the bucket 430 angle, position, and elevation. As above, the system 400 is initialized and the bucket 430 is brought to a desired angle. The system 400 additionally receives a desired or programmed elevation for the bucket 430 (which may be based on input from the operator, computed data, and/or 3D modeling data), and the operator or system 400 begin to urge the bucket 430 toward the tractor 415. If the sensors detect that the elevation and/or angle of the bucket 430 is below the desired value, the system 400 may reenable the pivot valve 445 to allow upward pivoting and/or the pivot valve 445 may deactivate and allow the natural rise in the bucket's 430 angle due to the bucket's 430 urging toward the tractor 415. Conversely, if the sensors detect that the elevation and/or angle of the bucket 430 is above the desired value, the pivot valve 445 may pivot the bucket 430 downward (dumping). This example may allow the system 400 to more precisely excavate a surface, especially when the excavation plans call for vertical variations in the desired grade.

In another example (hereinafter "example 4"), the system 400 may also perform grading with vertical variations. This example, however, typically requires two sensors (e.g., one on the bucket 430 and one on a boom arm 410, 420), although more sensors may be used. Because the bucket 430 is attached to the boom members 410, 420, there is a spatial relationship by which the elevation of the bucket 430 may be calculated relative to the position and elevation of the boom members 410, 420. As the piston members 435, 440 actuate, urging the boom members 410, 420 and the bucket 430 toward the tractor, this relationship may be continuously, and/or in some cases periodically, calculated to determine the relative elevation of the bucket 430. Further, the change in the position and/or elevation may be detected and calculated based on throttle position and subsequent rates of change. For example, a greater throttle position will typically result in a greater change of angle and position of the bucket 430, thus requiring a greater rate of corrective action. The system 400 may then use the position and elevation information received and calculated by the system 400 to enable or disable the pivot valve 445, raising or lowering the bucket 430 to the desired angle and/or elevation for grading.

In one final example (hereinafter "example 5"), the system 400 incorporates three-dimensional (3D) profiles and data to allow the system 400 to excavate according to a predetermined 3D routine. This example typically includes multiple sensors (e.g., 15, 20, 465) to sense the 3D orientation of the system 400 (e.g., position, elevation, tilt, pitch, yaw, etc.). The system 400 may therefore follow a 3D profile provided to the system 400 to accurately excavate the 3D profile in substrate. For example, if a 3D profile of a golf course required a one-foot-deep, smoothly curved depression, the system 400 may guide the bucket 430 along the desired decline and incline of the depression, with the system 400 controlling, as described above, the necessary piston members 435, 440, boom members 410, 420, valve(s) 445, and bucket 430 to replicate the depression. In some instances, this example may also enable not only vertical (i.e., up and down) digging but also horizontal (i.e., left and right) and diagonal (corner to corner) operation following at 3D profile using the same techniques as described above.

Figure 27:
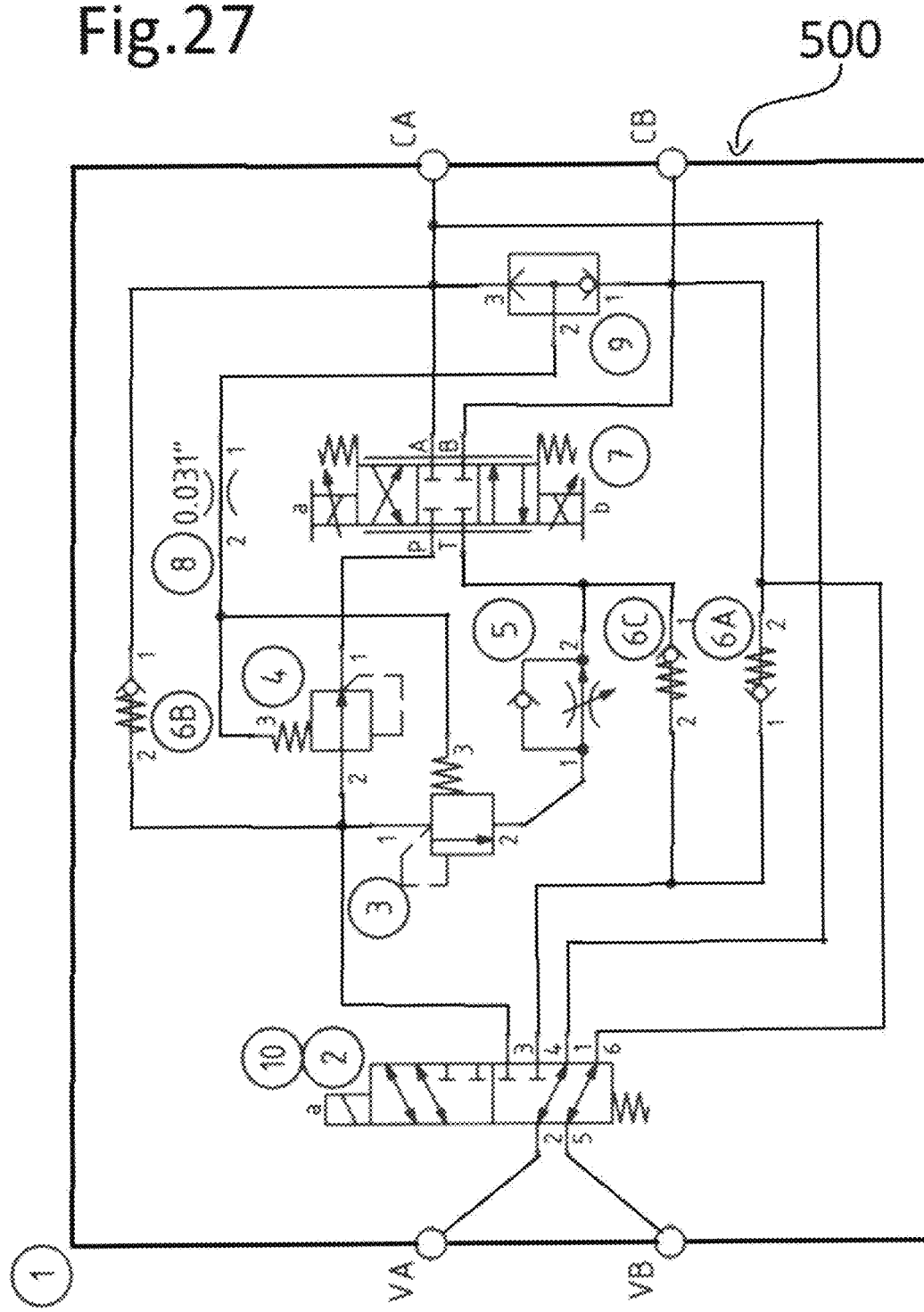
FIG. 27 is a schematic diagram of a valve system for excavation machines according to another embodiment of the present novel technology.

FIG. 27 illustrates another embodiment of the present novel technology, a valve system 500 for avoiding the traditional machine control by proportional valves. Instead of traditional 'pump and tank' design, this embodiment taps into the existing hydraulic system, such as connecting to one side of an existing hydraulic cylinder, allowing the hydraulics to pass through the valve largely unimpeded. Control of the valve by human operator input allows the operator to stop the machine or create a virtual 'tunnel' or set of virtual 'tracks', parameters within which the human operator may control the machine while the valve assembly prevents the machine from exceeding those parameters. The valve is typically an on/off or 'bang-bang' valve.

Figure 28:
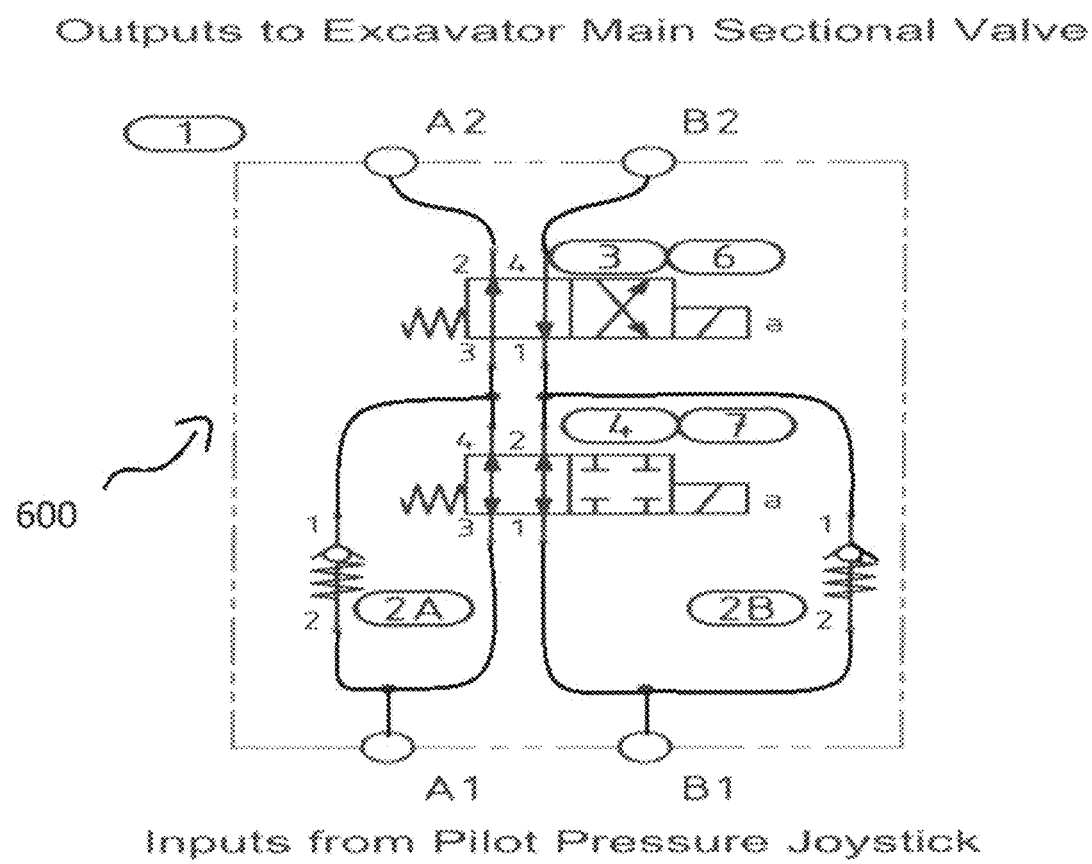
FIG. 28 is a schematic diagram of a valve system for excavation machines according to still another embodiment of the present novel technology.
Figure 29:
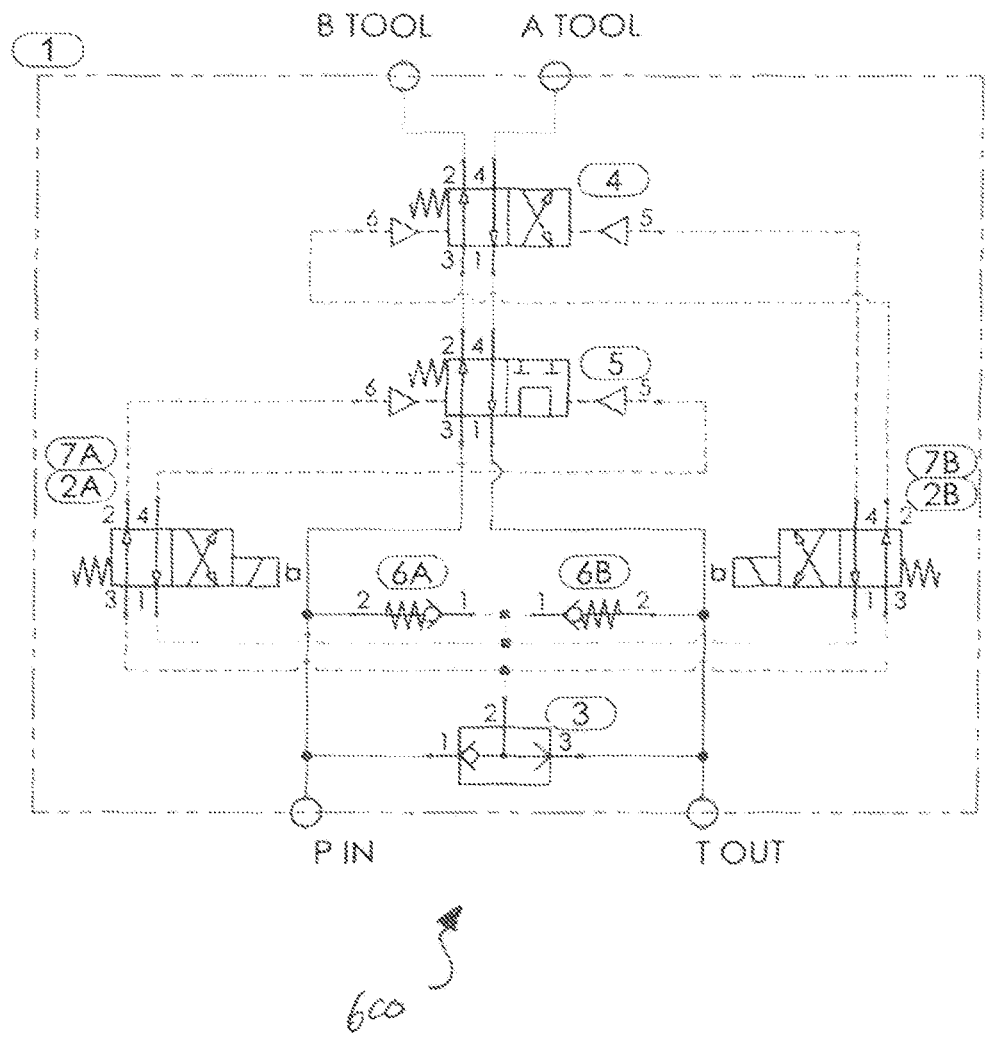
FIG. 29 is a second schematic diagram of a valve system for excavation machines according to the embodiment of FIG. 28.

FIGS. 28-29 illustrate yet another embodiment a valve system 600 for controlling a vehicle or excavator. The valve system 600 allows human control to speed up or slow down the automated and/or computer control as desired. In short, for a computer-controlled vehicle, the computer may adjust the rate of a turn (steering) by how fast the human is controlling the speed. Hence, if the vehicle is turning or moving at a slow rate of speed, the computer may make fast inputs or corrections of flow. If vehicle is travelling or turning at a high rate of speed, only very small and/or infrequent corrections or inputs would be required of the computer.

Figure 30:
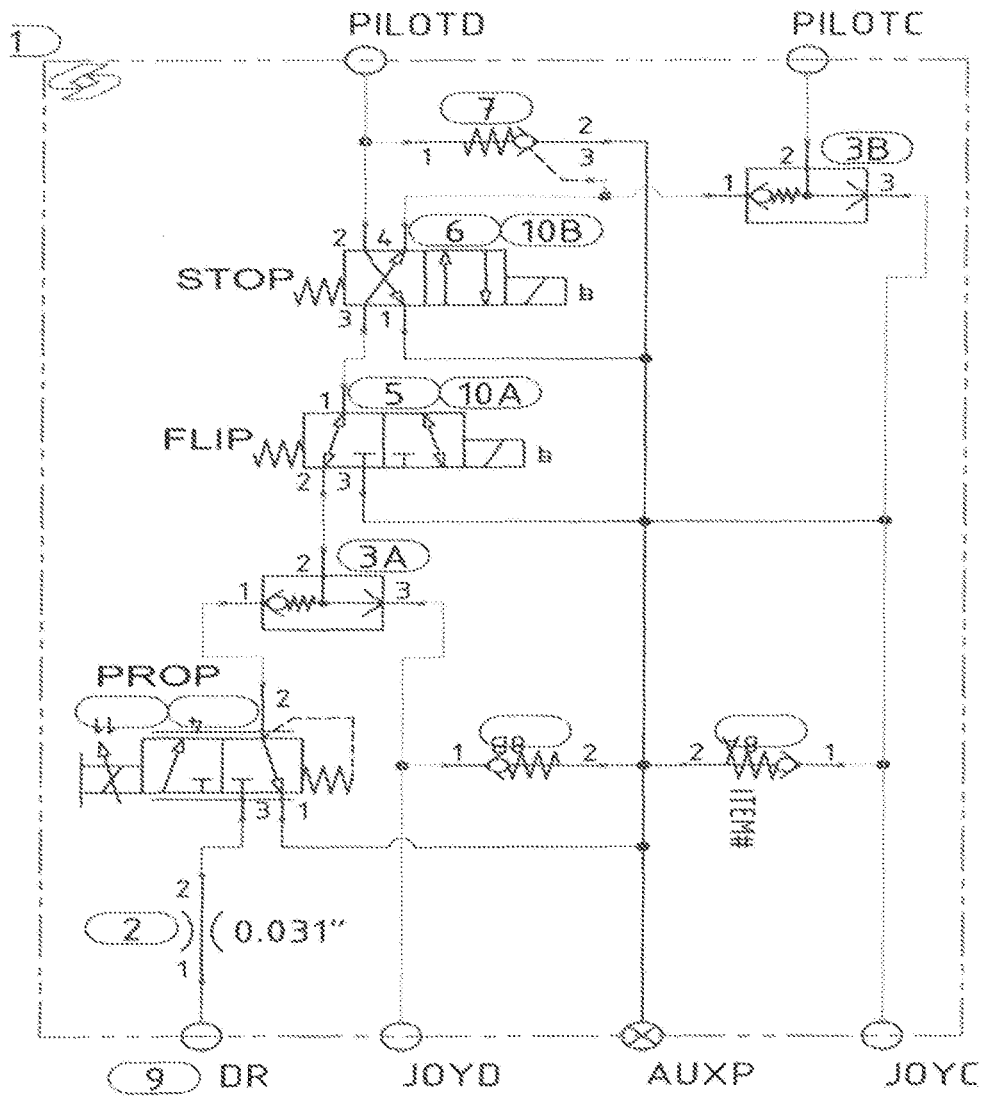
FIG. 30 is a schematic diagram of a valve system for excavation machines according to yet another embodiment of the present novel technology.
Figure 31:
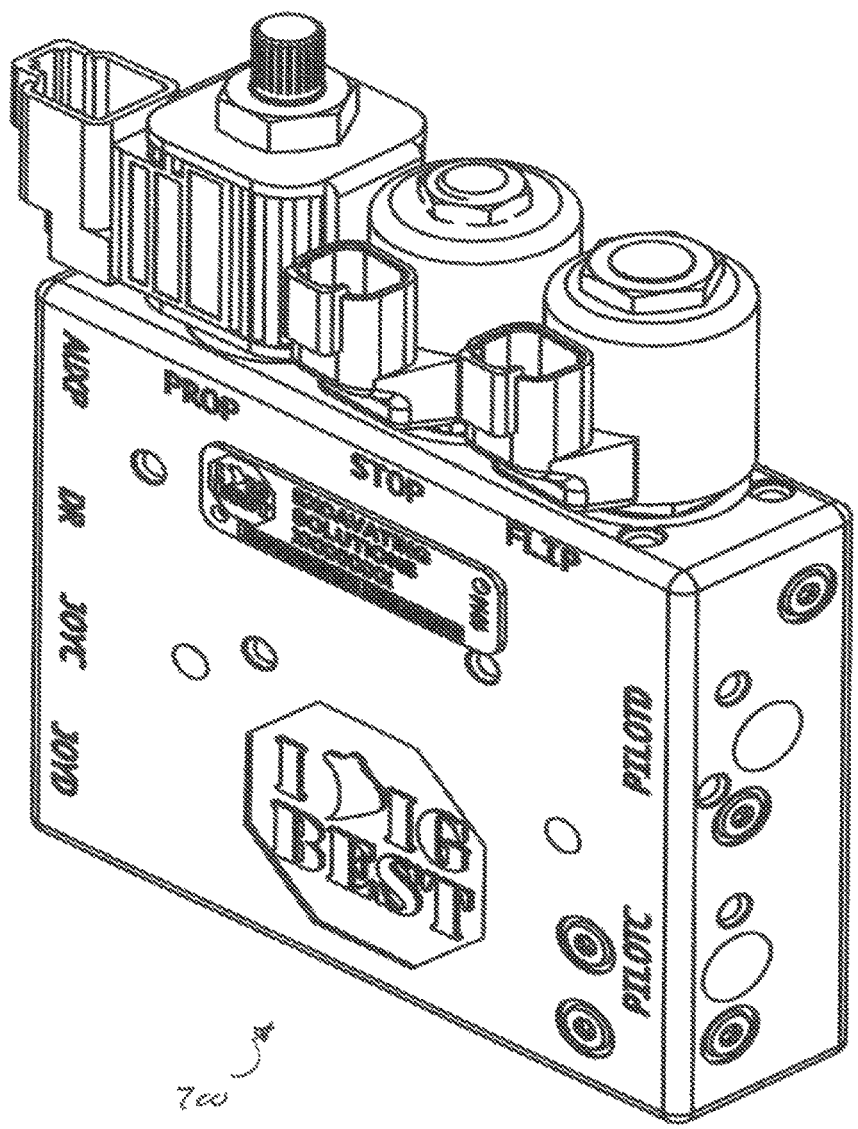
FIG. 31 is a perspective view of a valve according to the embodiment of FIG. 30.

FIGS. 30-31 illustrate still another embodiment valve system 700 for enabling computer enhanced operator control of excavation and like machines.

Figure 32:
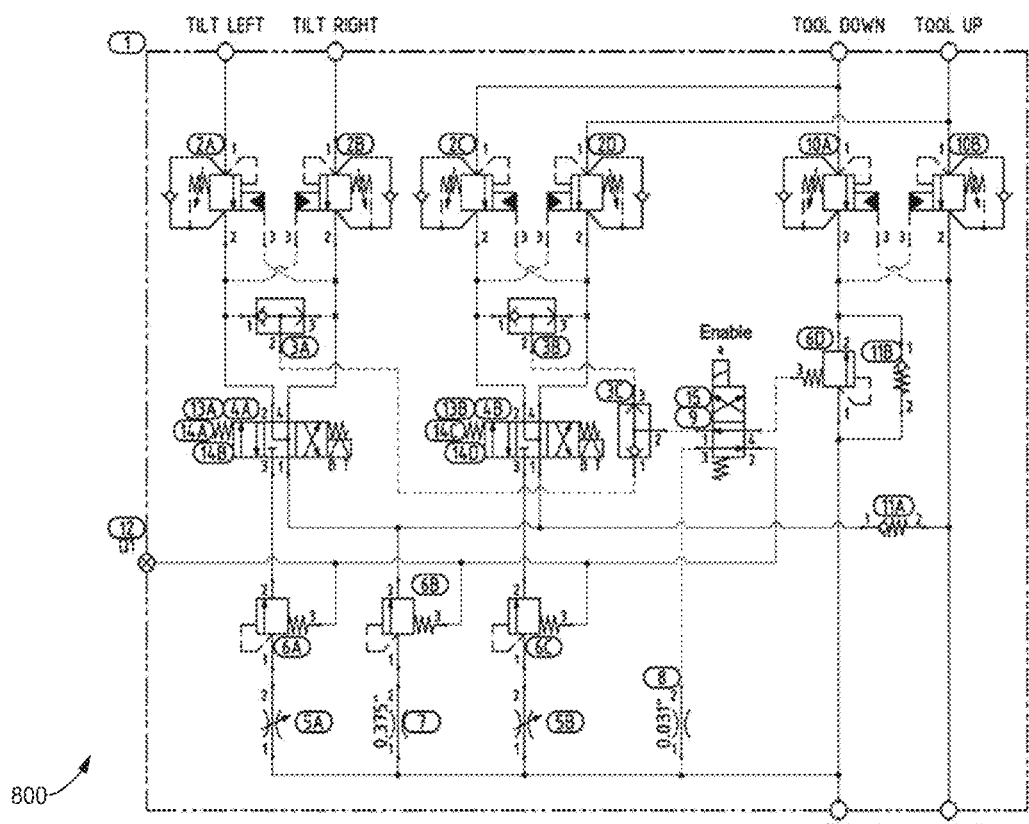
FIG. 32 is a schematic diagram of a valve system for excavation machines according to still another embodiment of the present novel technology.

FIG. 32 illustrates yet another embodiment valve system 800 for enabling computer enhanced operator control of excavation and like machines.

Figure 33:
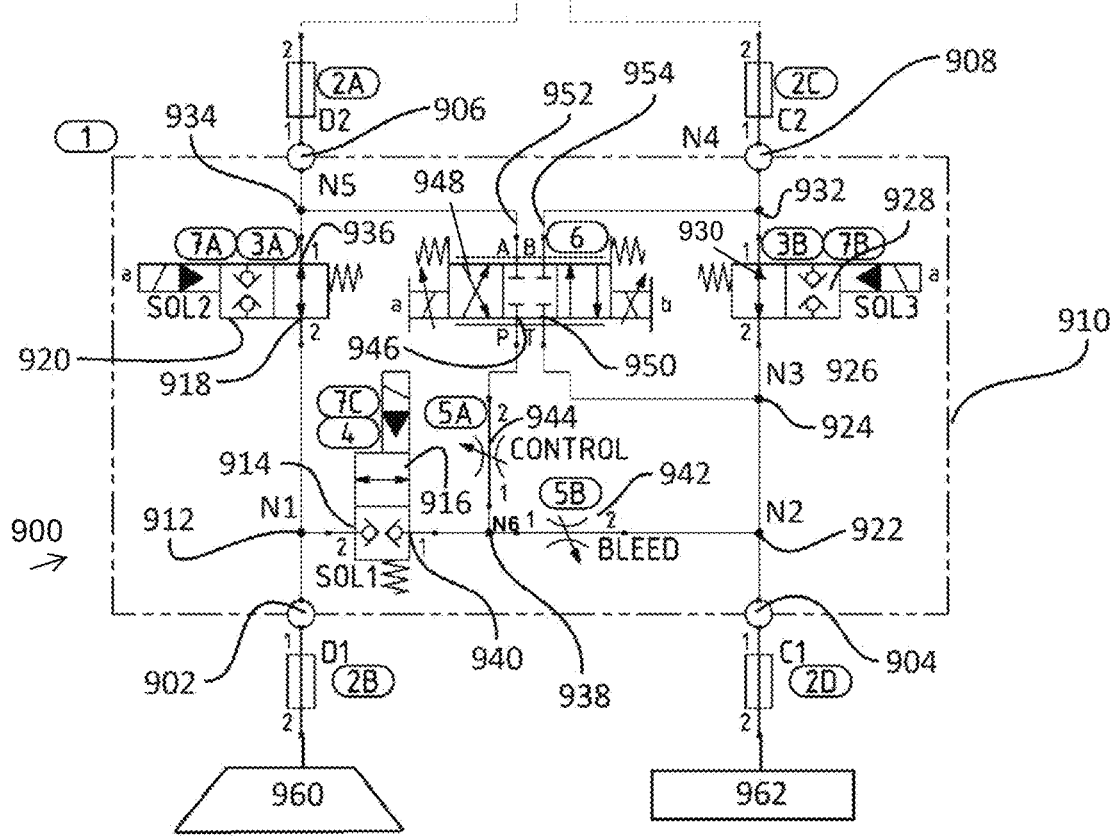
FIG. 33 is a schematic diagram of a valve system for excavation machines according to yet another embodiment of the present novel technology.

FIG. 33 illustrates still another embodiment valve system 900 for enabling computer enhanced or assisted operator control of hydraulic tools, such as hoes, bulldozers, and like excavation machines. Valve assembly 900 further includes ports 902, 904, 906 and 908, typically formed through housing 910. For simplicity, ports 902 and 904 are designated inlet ports and ports 906 and 908 are designated outlet ports, although fluid may flow through the valve assembly 900 and ports 902, 904, 906, 908 in either direction. Port 902 is fluidically connected (or in fluidic communication) with first node 912. First node 912 is fluidically connected to first port 914 of first two-position solenoid valve 916 and is fluidically connected to first port 918 of second two-position solenoid valve 920.

Second node 922 is fluidically connected to port 904 and is fluidically connected to third node 924. Third node 924 is fluidically connected to first port 926 of third two-position solenoid valve 928. Second port 930 of third two-position solenoid valve 928 is fluidically connected to fourth node 932, which is also fluidically connected to port 908.

Fifth node 934 is fluidically connected to port 906 and to second port 936 of second two-position solenoid valve 920. Sixth node 938 is fluidically connected to second port 940 of first two-position solenoid valve 916. First needle valve 942 is fluidically connected between second and sixth nodes 922, 938. Second needle valve 944 is fluidically connected between sixth node 938 and first port 946 of three-position double solenoid valve 948. Second port 950 of three-position double solenoid valve 948 is fluidically connected to third node 924, third port 952 of three-position double solenoid valve 948 is fluidically connected to fifth node 934, and fourth port 954 of three-position double solenoid valve 948 is fluidically connected to fourth node 932.

During operation, ports 902 and 904 are typically connected in fluidic communication with hydraulic control mechanisms or valves 960, 962, such as joystick controllers, that an operator may respectively manipulate or energize to send hydraulic fluid to respective ports 902, 904. Likewise, ports 906 and 908 are typically fluidically connected to respective ports 966, 968 of bidirectional hydraulic cylinder 970 that may be actuated to move tool 972.

Solenoid valve 916 is typically spring biased in the closed position such that no fluid may flow therethrough until its solenoid is energized to open the valve. Conversely, solenoid valves 920, 928 are typically spring biased in the open position, such that fluid may flow therethrough until their respective solenoids are energized to close the valves 920, 928. Solenoid valve 948 is spring biased in the closed position, and may be energized to allow flow therethrough from or between port 946 to port 952 and from or between port 950 to port 954 (regular mode), or, alternately, may be energized to allow flow therethrough from or between port 946 to port 954 and from or between port 950 to port 952 (flip mode).

Solenoid valves 916, 920, 928 and 948 are operationally connected to (such as in electric communication with) a computer, such as microprocessor 25 and/or electronic controller 470 as described above. When programmed with digging parameters and/or protocols, the microprocessor 25 and/or electronic controller 470 may automatically actuate one or more solenoid valves 916, 920, 928, 948 to override operator control to slow, stop, reverse or otherwise reroute the tool 972, so as to avoid a potential hazard. Such computer override is only possible when fluid is flowing through the valve assembly 900, as the valve assembly is not directly connected to a fluid source (such as a pump) or reservoir (such as a tank).

However, in each of the above valve system embodiments 500, 600, 700, 800, and 900, even during operator override, human interaction and control of the joysticks 960, 962, or like control of the flow of fluid through the valve assembly 900, whether via control of the computer outputs or signals or through valve interaction (as actuated through the joystick or like interface) will allow an operator to proportionally control how fast computer corrections are made. In other words, microprocessor 25 and/or electronic controller 470 cannot automatically or accidentally control machine without an operator exercising control, such as via joysticks 960, 962, to enable any fluid flow through the valve assembly 900 for the controller 25, 470 to capture for override.

Valve assembly 900 simplifies traditional ways of hooking up machine control valves unlike conventional methods of proportional control in machines. Valve assembly 900 requires only ON/OFF—(BANG-BANG) inputs from the computer 25, 470 to energize the solenoids to switch the two-way solenoid valves from their default open/closed positions to closed/open positions. However, the valve assembly 900 can work with proportional valve inputs if extremely fine controls are necessary. Valve assembly 900 does not require or include direct connection to hydraulic sources, such as a pump, or to hydraulic reservoirs, such as a tank.

While the above examples are provided to illustrate multiple individual uses of the system, it is understood that these examples may be combined, in whole or in part, with each other as well. For example, all parts of example 1 may be incorporated and/or overlaid upon the remaining cited examples. Further, the above examples illustrate several typical and expected use cases; however, the examples are not intended to limit the system, and the system is not limited to only the above-disclosed examples.

While the novel technology has been illustrated and described in detail in the drawings and foregoing description, the same is to be considered as illustrative and not restrictive in character. It is understood that the embodiments have been shown and described in the foregoing specification in satisfaction of the best mode and enablement requirements. It is understood that one of ordinary skill in the art could readily make a nigh-infinite number of insubstantial changes and modifications to the above-described embodiments and that it would be impractical to attempt to describe all such embodiment variations in the present specification. Accordingly, it is understood that all changes and modifications that come within the spirit of the novel technology are desired to be protected.

I claim:
1. A valve assembly, comprising:
a first assembly inlet port;
a second assembly inlet port;
a first assembly outlet port;
a second assembly outlet port;
a first two-position first solenoid activated valve operationally connected between the first assembly inlet port and the second assembly inlet port, wherein when the first solenoid is energized, fluid may flow therethrough, and wherein when the first solenoid is unenergized fluid may not flow therethrough;
a second two-position second solenoid activated valve operationally connected between the first assembly inlet port and the first assembly outlet port, wherein when the second solenoid is unenergized, fluid may flow therethrough, and wherein when the second solenoid is energized fluid may not flow therethrough;
a third two-position third solenoid activated valve operationally connected between the second assembly inlet port and the second assembly outlet port, wherein when the third solenoid is unenergized, fluid may flow therethrough, and wherein when the third solenoid is energized fluid may not flow therethrough;
a first needle valve operationally connected between the first two-position first solenoid activated valve and the second assembly inlet port;
a three-position double solenoid activated valve having first and second respective valve inlet ports and first and second respective valve outlet ports, wherein the second valve inlet port is connected in fluidic communication with the second inlet port, the first needle valve, and the third two-position third solenoid activated valve, the first valve outlet port is connected in fluidic communication with the first assembly outlet port and the second two-position second solenoid activated valve, and wherein the second valve outlet port is connected in fluidic communication with the second assembly outlet port and the third two-position second solenoid activated valve; and a second needle valve fluidically connected between the first two-position first solenoid activated valve and the first valve inlet port.

2. The valve assembly of claim 1 wherein first assembly inlet port is fluidically connected to a first node; wherein the first node is fluidically connected to a first first two-position solenoid valve port and is fluidically connected to a first second two-position solenoid valve port; wherein a second node is fluidically connected to the second assembly inlet port and is fluidically connected to a third node; wherein the third node is fluidically connected to a first third two-position solenoid valve port; wherein a second third two-position solenoid valve port is fluidically connected to a fourth node; wherein the fourth node is fluidically connected to the second assembly outlet port; wherein a fifth node is fluidically connected to the first assembly outlet port and to a second second two-position solenoid valve port; wherein a sixth node is fluidically connected to a second first two-position solenoid valve port; wherein the first needle valve is fluidically connected between the second and sixth nodes; wherein the second needle valve is fluidically connected between the sixth node and a first three-position double solenoid valve port; wherein the second three-position double solenoid valve port is fluidically connected to the third node; wherein a third three-position double solenoid valve port is fluidically connected to the fifth node; and wherein a fourth three-position double solenoid valve port is fluidically connected to the fourth node.

3. The valve assembly of claim 1 wherein the first and second assembly inlet ports are fluidically connected to respective operator controlled valves and wherein the first and second assembly outlet ports are fluidically connected to a tool hydraulic cylinder.

4. The valve assembly of claim 1 wherein each respective solenoid controlled valve is operationally connected to an electronic controller.

5. A digging machine, comprising:
a tractor portion;
at least one boom arm portion operationally connected to the tractor portion;
a bucket arm portion operationally connected to the at least one boom arm portion;
a bucket portion operationally connected to the bucket arm portion;
a boom hydraulic piston portion operationally connected to the at least one boom arm portion;
a bucket hydraulic piston portion operationally connected to the bucket portion;
a hydraulic fluid source operationally connected to each respective hydraulic piston portion;
a valve system operationally connected to the hydraulic fluid source; and
a hydraulic valve operationally connected to the boom hydraulic piston portion, the valve system, and to the hydraulic fluid source;
a microprocessor;
a display operationally connected to the microprocessor; and
a first sensor operationally connected to the bucket portion and to the microprocessor;
wherein each respective hydraulic piston portion has a respective first and a respective second hydraulic fluid port formed therethrough;
wherein the hydraulic valve may be engaged to connect the respective first and second hydraulic fluid ports formed through the boom hydraulic piston portion in direct hydraulic communication with one another;

wherein the microprocessor is operationally connected to the hydraulic fluid source, to the hydraulic valve, and to each respective hydraulic pistons; and wherein the microprocessor may be engaged to assist movement of the bucket portion through a predetermined digging profile;

wherein the valve assembly further comprises:
a first assembly inlet port;
a second assembly inlet port;
a first assembly outlet port;
a second assembly outlet port;
a first two-position first solenoid activated valve operationally connected between the first assembly inlet port and the second assembly inlet port, wherein when the first solenoid is energized, fluid may flow therethrough, and wherein when the first solenoid is unenergized fluid may not flow therethrough;
a second two-position second solenoid activated valve operationally connected between the first assembly inlet port and the first assembly outlet port, wherein when the second solenoid is unenergized, fluid may flow therethrough, and wherein when the second solenoid is energized fluid may not flow therethrough;
a third two-position third solenoid activated valve operationally connected between the second assembly inlet port and the second assembly outlet port, wherein when the third solenoid is unenergized, fluid may flow therethrough, and wherein when the third solenoid is energized fluid may not flow therethrough;
a first needle valve operationally connected between the first two-position first solenoid activated valve and the second assembly inlet port;
a three-position double solenoid activated valve having first and second respective valve inlet ports and first and second respective valve outlet ports, wherein the second valve inlet port is connected in fluidic communication with the second inlet port, the first needle valve, and the third two-position third solenoid activated valve, the first valve outlet port is connected in fluidic communication with the first assembly outlet port and the second two-position second solenoid activated valve, and wherein the second valve outlet port is connected in fluidic communication with the second assembly outlet port and the third two-position second solenoid activated valve; and
a second needle valve fluidically connected between the first two-position first solenoid activated valve and the first valve inlet port;
wherein first assembly inlet port is fluidically connected to a first node;
wherein the first node is fluidically connected to a first first two-position solenoid valve port and is fluidically connected to a first second two-position solenoid valve port;
wherein a second node is fluidically connected to the second assembly inlet port and is fluidically connected to a third node;
wherein the third node is fluidically connected to a first third two-position solenoid valve port;
wherein a second third two-position solenoid valve port is fluidically connected to a fourth node;
wherein the fourth node is fluidically connected to the second assembly outlet port;

wherein a fifth node is fluidically connected to the first assembly outlet port and to a second second two-position solenoid valve port;
wherein a sixth node is fluidically connected to a second first two-position solenoid valve port;
wherein the first needle valve is fluidically connected between the second and sixth nodes;
wherein the second needle valve is fluidically connected between the sixth node and a first three-position double solenoid valve port;
wherein the second three-position double solenoid valve port is fluidically connected to the third node;
wherein a third three-position double solenoid valve port is fluidically connected to the fifth node; and
wherein a fourth three-position double solenoid valve port is fluidically connected to the fourth node.

6. The digging machine of claim 5 wherein the first sensor is selected from the group comprising angle sensors, line sensors, accelerometers, inclinometers, gyroscopes GPS transceivers, and combinations thereof.

7. The digging machine of claim 5, wherein the microprocessor is operable to:
initialize the digging machine;
calibrate the digging machine;
receive into memory the pre-excavation location of underground objects;
receive into memory the desired post-excavation landscape contours;
initialize excavation;
monitor operator controlled excavation;
display the location of the bucket relative to the location of underground objects in real time;
adjust trajectory of the bucket; and
halt excavation.

8. The digging machine of claim 7, wherein the microprocessor is further operable to:
calculate an elevation and an angle of the bucket portion to determine a bucket position and a bucket orientation;
control the bucket portion to a predetermined elevation and a predetermined angle;
initialize the hydraulic valve; and
actuate the bucket hydraulic piston.

9. The digging machine of claim 1 further comprising:
a second sensor operationally connected to the bucket arm portion and to the microprocessor; and
a third sensor operationally connected to the at least one boom arm portion and to the microprocessor.

10. The digging machine of claim 7 wherein the microprocessor may override operator control during operator controlled excavation to maintain the bucket within predetermined digging parameters; wherein the microprocessor may control the bucket only while fluid is flowing through an assembly inlet port.

11. A valve system, comprising:
a first port;
a second port;
a first flow path fluidically connecting the first and second ports;
a third port;
a fourth port;
a second flow path fluidically connecting the third and fourth ports;
a first valve fluidically connected in the first flow path and energizable to block the first flow path;
a second valve fluidically connected in the second flow path and energizable to block the second flow path;

a third flow path fluidically connecting the first and second port;

a fourth flow path fluidically connecting the third and fourth ports;

wherein the third and fourth flow paths are more restricted than the respective first and second flow paths;

a fifth flow path fluidically connecting the first and fourth ports;

a sixth flow path fluidically connecting the second and third ports;

wherein when the third and fourth flow paths are open, the first, second, fifth, and sixth flow paths are blocked;

wherein when the first and second flow paths are open, the third, fourth, fifth, and sixth flow paths are blocked; and wherein when the fifth and sixth flow paths are open, the first, second, third, and fourth, flow paths are blocked.

12. The valve system of claim 11 wherein the third, fourth, fifth and sixth flow paths extend through a three-position double solenoid activated valve having first and second respective valve inlet ports and first and second respective valve outlet ports; wherein the first valve outlet port is fluidically connected to the second port; wherein the second valve outlet port is fluidically connected to the fourth port; wherein the first valve inlet port is fluidically connected to the first port; and wherein the second valve inlet port is fluidically connected to the third port.

13. The valve system of claim 11 wherein the three-position double solenoid valve has a first spring-biased default position wherein the inlet ports are not in fluidic communication with the outlet ports; wherein the three-position double solenoid valve may be energized to actuate a second position wherein the respective first and second inlet ports are in fluidic communication with the respective first and second outlet ports; and wherein the three-position double solenoid valve may be energized to actuate a third position wherein the respective first and second inlet ports are in fluidic communication with the respective second and first outlet ports.

* * * * *